(12) United States Patent
Wu et al.

(10) Patent No.: US 7,983,902 B2
(45) Date of Patent: Jul. 19, 2011

(54) DOMAIN DICTIONARY CREATION BY DETECTION OF NEW TOPIC WORDS USING DIVERGENCE VALUE COMPARISON

(75) Inventors: Jun Wu, Saratoga, CA (US); Tang Xi Liu, Beijing (CN); Feng Hong, Foster City, CA (US); Yonggang Wang, Beijing (CN); Bo Yang, Beijing (CN); Lei Zhang, Beijing (CN)

(73) Assignee: Google Inc., Mountain View, CA (US)

( * ) Notice: Subject to any disclaimer, the term of this patent is extended or adjusted under 35 U.S.C. 154(b) by 907 days.

(21) Appl. No.: 11/844,067

(22) Filed: Aug. 23, 2007

(65) Prior Publication Data
US 2009/0055381 A1 Feb. 26, 2009

(51) Int. Cl.
*G06F 17/21* (2006.01)
*G06F 17/20* (2006.01)
*G06F 17/27* (2006.01)

(52) U.S. Cl. .................................. 704/10; 704/1; 704/9
(58) Field of Classification Search .................. None
See application file for complete search history.

(56) References Cited

U.S. PATENT DOCUMENTS

| | | | | |
|---|---|---|---|---|
| 6,052,657 | A * | 4/2000 | Yamron et al. ................. | 704/9 |
| 6,128,613 | A * | 10/2000 | Wong et al. .................... | 707/738 |
| 6,167,368 | A | 12/2000 | Wacholder | |
| 6,651,058 | B1 | 11/2003 | Sundaresan et al. | |
| 6,711,577 | B1 * | 3/2004 | Wong et al. .................... | 707/694 |
| 7,024,624 | B2 * | 4/2006 | Hintz ............................. | 715/205 |
| 7,478,033 | B2 | 1/2009 | Wu et al. | |
| 7,680,649 | B2 | 3/2010 | Park | |
| 2004/0225667 | A1 | 11/2004 | Hu et al. | |
| 2005/0021324 | A1 * | 1/2005 | Brants et al. ...................... | 704/9 |
| 2005/0278613 | A1 | 12/2005 | Morinaga et al. | |
| 2007/0143101 | A1 | 6/2007 | Goutte | |
| 2009/0055168 | A1 | 2/2009 | Wu et al. | |

OTHER PUBLICATIONS

Hitamitsu et al. "Topic Word Selection Based on Combinatorial Probability". NLPRS—2001, pp. 289-296.*
Lavrenko et al. "Relevance Models for Topic Detection and Tracking". In Proceedings of HLT-2002.*
He et al. "An Approach to Automatically Constructing Domain Ontology". In: PACLIC 2006, Wuhan, China, Nov. 1-3, 2006 pp. 150-157.*
Ko et al. "Using Classification Techniques for Informal Requirements in the Requirements Analysis-supporting System". Information and Software Technology 49, 2007, pp. 1128-1140.*

(Continued)

*Primary Examiner* — Talivaldis I Smits
*Assistant Examiner* — Jesse S Pullias
(74) *Attorney, Agent, or Firm* — Fish & Richardson P.C.

(57) ABSTRACT

Methods, systems, and apparatus, including computer program products, to identify topic words in a document corpus that includes topic documents related to a topic are disclosed. A reference topic word divergence value based on the document corpus and the topic document corpus is determined. A candidate topic word divergence value for a candidate topic word is determined based on the document corpus and the topic document corpus. The candidate topic word is determined to be a topic word if the candidate topic word divergence value is greater than the reference topic word divergence value.

24 Claims, 13 Drawing Sheets

OTHER PUBLICATIONS

Yih et al. "Finding Advertising Keywords on Web Pages". Proceedings of the 15th International Conference on World Wide Web, May 2006, Scotland, pp. 213-222.*

Ryu et al. Determining the Specificity of Terms based on Information Theoretic Measures. CompuTerm 2004 Poster Session—3rd International Workshop on Computation Terminology, pp. 87-90.*

Notification Concerning Transmittal of International Preliminary Report on Patentability and the Written Opinion of the International Searching Authority, PCT/CN2008/072128, Mar. 4, 2010, 10 pages.

He, S. et al., "A Bootstrap Method for Chinese New Words Extraction," Acoustics, Speech, and Signal Processing, 2001. Proceedings. (ICASSP '01). IEEE International Conference, vol. 1, pp. 581-584.

Jiang, W. et al., "An Improved Unknown Word Recognition Model based on Multi-Knowledge Source Method*, "Intelligent Systems Design and Applications, 2006. ISDA '06. Sixth International Conference Oct. 16-18, 2006, pp. 825-832, 6 pages.

Ren, He. "A Chinese Word Extraction Algorithm Based on Information Entropy," J of Chinese Information Processing, vol. 20, No. 5, 2006, 5 pages.

Sui, Z. et al., Automatic Recognition of Chinese Scientific and Technological Terms Using Integrated Linguistic Knowledge, Natural Language Processing and Knowledge Engineering, 2003. Proceedings. 2003 International Conference, Oct. 26-29, 2003, pp. 444-451.

USPTO Non-Final Office Action in U.S. Appl. No. 11/844,153, mailed Sep. 9, 2010, 10 pages.

Fish & Richardson P.C., Amendment in Reply to Action dated Sep. 9, 2010 in U.S. Appl. No. 11/844,153, filed Nov. 5, 2010, 11 pages.

* cited by examiner

DOMAIN DICTIONARY CREATION BY DETECTION OF NEW TOPIC WORDS USING DIVERGENCE VALUE COMPARISON

BACKGROUND

This disclosure relates to dictionaries for natural language processing applications, such as machine translation, non-Roman language word segmentation, speech recognition and input method editors.

Increasingly advanced natural language processing techniques are used in data processing systems, such as speech processing systems, handwriting/optical character recognition systems, automatic translation systems, or for spelling/grammar checking in word processing systems. These natural language processing techniques can include automatic updating of dictionaries for natural language applications related to, e.g., non-Roman language word segmentation, machine translation, automatic proofreading, speech recognition, input method editors, etc.

Non-Roman languages that use a logographic script in which one or two characters, e.g., glyphs, correspond to one word or meaning have more characters than keys on a standard input device, such as a computer keyboard on a mobile device keypad. For example, the Chinese language contains tens of thousands of ideographic characters defined by base phonetic or Pinyin characters and five tones. The mapping of these many to one associations can be implemented by input methods that facilitate entry of characters and symbols not found on input devices. Accordingly, a Western style keyboard can be used to input Chinese, Japanese, or Korean characters.

An input method editor can be used to realize an input method. Such input method editors can include or access dictionaries of words and/or phrases. Lexicons of languages are constantly evolving, however, and thus the dictionaries for the input method editors can require frequent updates. For example, a new word may be rapidly introduced into a language, e.g., a pop-culture reference or a new trade name for a product may be introduced into a lexicon. Failure to update an input method editor dictionary in a timely manner can thus degrade the user experience, as the user may be unable to utilize or have difficulty utilizing the input method editor to input the new word into an input field. For example, a user may desire to submit a new word, e.g., a new trade name, as a search query to a search engine. If the input method editor does not recognize the new word, however, the user may experience difficulty in inputting the new word into the search engine.

In some languages such as Chinese, Japanese, Thai and Korean, there are no word boundaries in sentences. Therefore, new words cannot be easily identified in the text, as the new words are compounded sequences of characters or existing words. This makes new word detection a difficult task for those languages. Additionally, once new words are identified, it is desirable to identify topics to which the new words and other existing words are related. The identification of such topics can improve the performance of a language model and/or a system or device using the language model for languages without boundaries in sentences, or for other languages.

SUMMARY

Disclosed herein are methods, systems and apparatus for automatically identifying topic domains and creating domain dictionaries related to the topic domains. In an implementation, a method includes determining a topic divergence value that is substantially proportional to a ratio of a first topic word distribution in a topic document corpus to a second topic word distribution in a document corpus. The topic document corpus is a corpus of topic documents related to a topic, and the document corpus is a corpus of documents that includes the topic documents and other documents. The method also includes determining a candidate topic word divergence value for a candidate topic word. The candidate topic word divergence value is substantially proportional to a ratio of a first distribution of the candidate topic word in the topic document corpus to a second distribution of the candidate topic word in the document corpus. The method determines whether the candidate topic word is a new topic word based on the candidate topic word divergence value and the topic divergence value.

In another implementation, a method includes selecting a topic dictionary comprising topic words related to a topic, and determining a topic word divergence value based on a topic word, a document corpus and a topic document corpus. The topic document corpus is a corpus of topic documents related to a topic, and the document corpus is a corpus of documents that includes the topic documents and other documents. The topic word is a word that is related to the topic. The method also includes determining a candidate topic word divergence value for a candidate topic word based on the document corpus and the topic document corpus, and determining whether the candidate topic word is a new topic word based on the candidate topic word divergence value and the topic word divergence value.

In another implementation, a system includes a data store, a topic word processing module and a dictionary updater module. The data store data store stores a topic dictionary comprising topic words related to a topic. The topic word processing module is configured to determine a topic word divergence value based on a topic word, a document corpus and a topic document corpus. The topic document corpus is a corpus of topic documents related to a topic, and the document corpus is a corpus of documents that includes the topic documents and other documents. The topic word is a word that in a topic dictionary that is related to the topic. The topic word processing module is also configured to select a candidate topic word and determine a candidate topic word divergence value for the candidate topic word based on the document corpus and the topic document corpus, and determine whether the candidate topic word is a topic word based on the candidate topic word divergence value and the topic word divergence value. The dictionary updater module is configured to store the candidate topic word in the topic dictionary if the candidate topic word is determined to be a topic word.

According to the methods, systems and apparatus provided in the disclosure, the data processing performance of a system using a language model, e.g., a language model for languages without boundaries in sentences, may be improved. For example, the system or device may have improved performance in speech processing, handwriting/optical character recognition, automatic translation, automatic classification, automatic abstracting, and/or spell/grammar checking in word processing systems by use of automatically updated topic dictionaries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
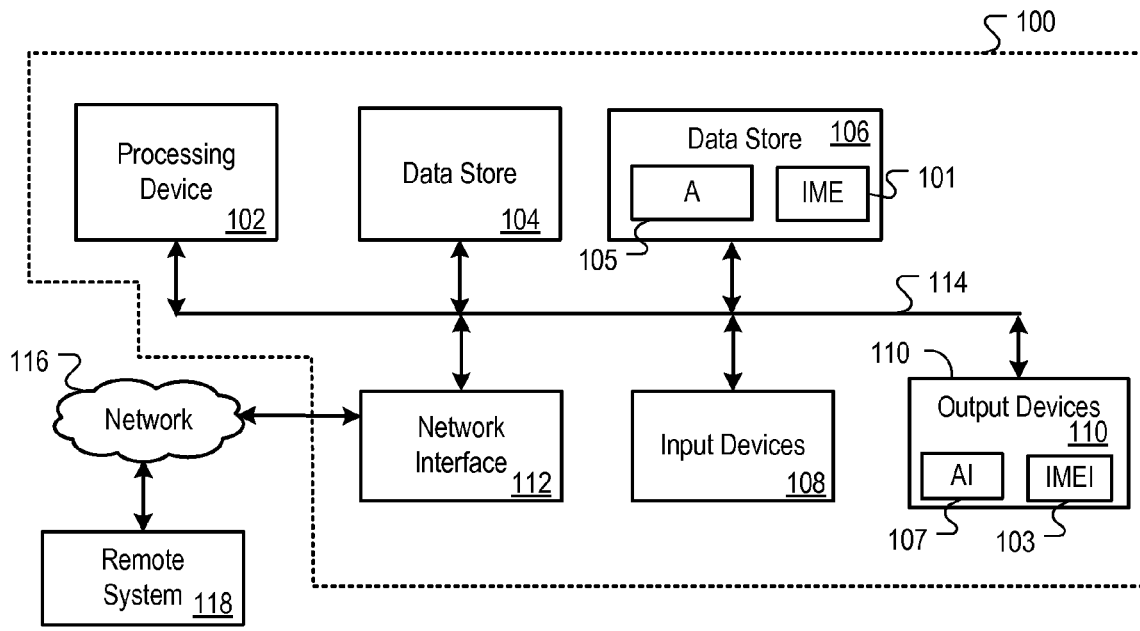
FIG. 1A is a block diagram of an example device 100 that can be utilized to implement an input method editor.

FIG. 1A is a block diagram of an example device 100 that can be utilized to implement an input method editor (IME). The device 100 can, for example, be implemented in a computer device, such as a personal computer device, a network server, a telecommunication switch, or other electronic devices, such as a mobile phone, mobile communication device, personal digital assistant (PDA), game box, and the like.

The example device 100 includes a processing device 102, a first data store 104, a second data store 106, input devices 108, output devices 110, and a network interface 112. A bus system 114, including, for example, a data bus and a motherboard, can be used to establish and control data communication between the components 102, 104, 106, 108, 110 and 112, Other example system architectures can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

Example input devices 108 can include a keyboard, a mouse, a stylus, a touch screen display etc., and example output devices 110 can include a display device, an audio device, etc. The network interface 112 can, for example, include a wired or wireless network device operable to communicate data to and from a network 116. The network 116 can include one or more local area networks (LANs) and/or a wide area network (WAN), such as the Internet.

In some implementations, the device 100 can include input method editor code 101 in a data store, such as the data store 106. The input method editor code 101 can be defined by instructions that upon execution cause the processing device 102 to carry out input method editing functions. In an implementation, the input method editor code 101 can, for example, comprise interpreted instructions, such as script instructions, e.g., JavaScript or ECMAScript instructions, which can be executed in a web browser environment. Other implementations can also be used, e.g., compiled instructions, a stand-alone application, an applet, a plug-in module, etc.

Execution of the input method editor code 101 generates or launches an input method editor instance 103. The input method editor instance 103 can define an input method editor environment, e.g., user interface, and can facilitate the processing of one or more input methods at the device 100, during which time the device 100 can receive composition inputs for input characters, ideograms, or symbols, such as, for example, Hanzi characters. For example, the user can use one or more of the input devices 108 (e.g., a keyboard, such as a Western-style keyboard, a stylus with handwriting recognition engines, etc.) to input composition inputs for identification of Hanzi characters. In some examples, a Hanzi character can be associated with more than one composition input.

The first data store 104 and/or the second data store 106 can store an association of composition inputs and characters. Based on a user input, the input method editor instance 103 can use information in the data store 104 and/or the data store 106 to identify one or more candidate characters represented by the input. In some implementations, if more than one candidate character is identified, the candidate characters are displayed on an output device 110. Using the input device 108, the user can select from the candidate characters a Hanzi character that the user desires to input.

In some implementations, the input method editor instance 103 on the device 100 can receive one or more Pinyin composition inputs and convert the composition inputs into Hanzi characters. The input method editor instance 103 can, for example, use compositions of Pinyin syllables or characters received from keystrokes to represent the Hanzi characters. Each Pinyin syllable can, for example, correspond to a key in the Western style keyboard. Using a Pinyin input method editor, a user can input a Hanzi character by using composition inputs that include one or more Pinyin syllables representing the sound of the Hanzi character. Using the Pinyin IME, the user can also input a word that includes two or more Hanzi characters by using composition inputs that include two or more Pinyin syllables representing the sound of the Hanzi characters. Input methods for other languages, however, can also be facilitated.

Other application software 105 can also be stored in data stores 104 and/or 106, including web browsers, word processing programs, e-mail clients, etc. Each of these applications can generate a corresponding application instance 107. Each application instance can define an environment that can facilitate a user experience by presenting data to the user and facilitating data input from the user. For example, web browser software can generate a search engine environment; e-mail software can generate an e-mail environment; a word processing program can generate an editor environment; etc.

In some implementations, a remote computing system 118 having access to the device 100 can also be used to edit a logographic script. For example, the device 100 may be a server that provides logographic script editing capability via the network 116. In some examples, a user can edit a logographic script stored in the data store 104 and/or the data store 106 using a remote computing system, e.g., a client computer. Alternatively, a user can edit a logographic script stored on the remote system 118 having access to the device 100, e.g., the device 100 may provide a web-based input method editor that can be utilized by a client computer. The device 100 can, for example, select a character and receive a composition input from a user over the network interface 112. The processing device 102 can, for example, identify one or more characters adjacent to the selected character, and identify one or more candidate characters based on the received composition input and the adjacent characters. The device 100 can transmit a data communication that includes the candidate characters back to the remote computing system.

Other implementations can also be used. For example, input method editor functionality can be provided to a client device in the form of an applet or a script.

Figure 1B:
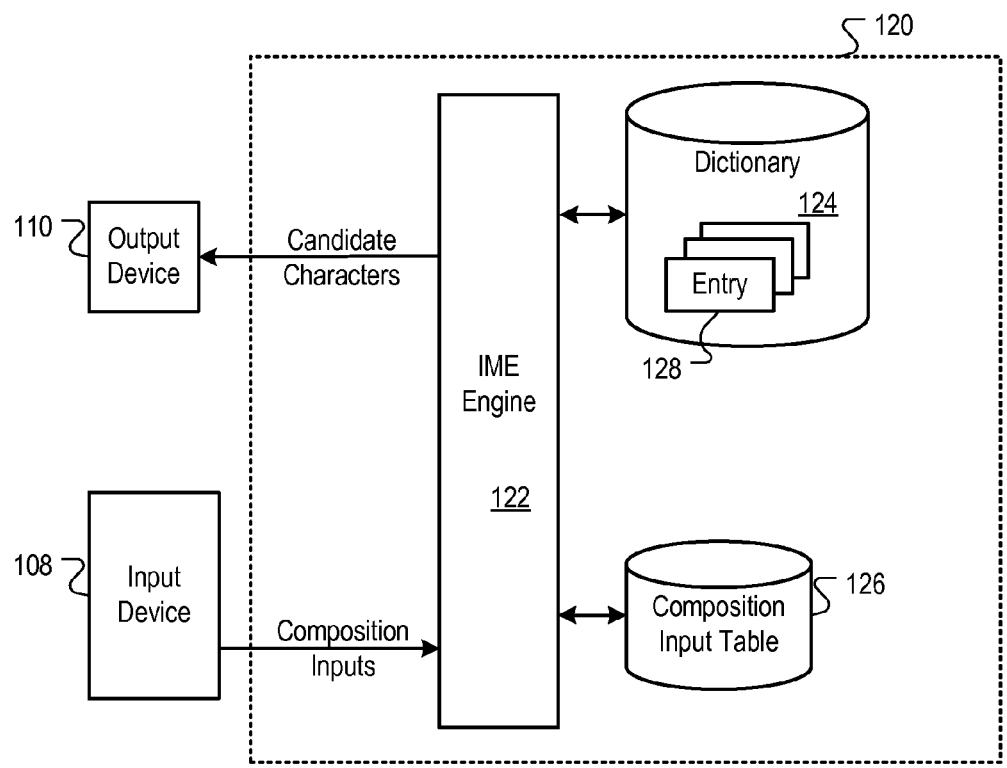
FIG. 1B is a block diagram of an example input method editor system 120.

FIG. 1B is a block diagram of an example input method editor system 120. The input method editor system 120 can, for example, be implemented using the input method editor code 101 and associated data stores 104 and 106. The input method editor system 120 includes an input method editor engine 122, a dictionary 124, and a composition input data store 126. Other implementation and storage architectures can also be used. In some implementations, the composition input data store 126 can include a language model. For example, the language model can be a probability matrix of a current word given at least one previous word (e.g., a unigram model).

In an implementation directed to the Chinese language, a user can use the IME system 120 to enter Chinese words or phrases by typing Pinyin characters. The IME engine 122 can search the dictionary 124 to identify candidate dictionary entries each including one or more Chinese words or phrases that match the Pinyin characters. The dictionary 124 includes entries 128 that correspond to known characters, words, or phrases of a logographic script used in one or more language models, and characters, words, and phrases in Roman-based or western-style alphabets, for example, English, German, Spanish, etc.

A word may include one Hanzi character or a sequence of consecutive Hanzi characters. A sequence of consecutive Hanzi characters may constitute more than one word in the dictionary 124. For example, a word ("苹果") having the meaning "apple" includes two constituent Hanzi characters "苹" and "果" that correspond to Pinyin inputs "ping" and "guo," respectively. The character "果" is also a constituent word that has the meaning "fruit." Likewise, the word "全球定位系统" constitutes of three words in the dictionary 124. The constituent words can include (1) "全球," meaning "global," (2) "定位," meaning "positioning," and (3) "系统," meaning "system." Each of the words "全球," "定位," and "系统" are likewise constituted of two constituent words that exist in the dictionary 124.

The dictionary entries 128 may include, for example, idioms (e.g., "胸有成竹"), proper names (e.g., "奥地利共和国", meaning "Republic of Austria"), names of historical characters or famous people (for example, "成吉思汗", meaning "Genghis Khan"), terms of art (e.g., "全球定位系统", meaning "Global Positioning System"), phrases ("一去不复返"), book titles (for example, "红楼梦", meaning "Dream of the Red Chamber"), titles of art works (for example, "清明上河图", meaning "Upper River During the Qing Ming Festival"), and movie titles (for example, "卧虎藏龙", meaning "Crouching Tiger, Hidden Dragon"), etc., each including one or more characters. Similarly, the dictionary entries 128 may include, for example, names of geographical entities or political entities, names of business concerns, names of educational institutions, names of animals or plants, names of machinery, song names, titles of plays, names of software programs, names of consumer products, etc. The dictionary 124 may include, for example, thousands of characters, words and phrases.

In some implementations, the dictionary 124 includes information about relationships between characters. For example, the dictionary 124 can include scores or probability values assigned to a character depending on characters adjacent to the character. The dictionary 124 can include entry scores or entry probability values each associated with one of the dictionary entries 128 to indicate how often the entry 128 is used in general.

The composition input data store 126 includes an association of composition inputs and the entries 128 stored in the dictionary 124. In some implementations, the composition input data store 126 can link each of the entries in the dictionary 124 to a composition input (e.g., Pinyin input) used by the input method editor engine 122. For example, the input method editor engine 122 can use the information in the dictionary 124 and the composition input data store 126 to associate and/or identify one or more entries in the dictionary 124 with one or more composition inputs in the composition input data store 126. Other associations can also be used. The candidate selections in the IME system 120 can be ranked and presented in the input method editor according to the rank.

In some implementations, the input method editor engine 122 can use the language model of the composition input data store 126 to associate and/or identify the entries. For example, the IME system 120 can use the language model to rank the candidate associations based on one or more previous input words.

Some of the words and phrases stored in the dictionary 124 may have a long history in a lexicon, while other words and phrases may be relatively new. Because the lexicon of a language is constantly evolving, the dictionary 124 may require frequent updates. To facilitate an accurate and timely update, a word detection system can be utilized.

Figure 2A:
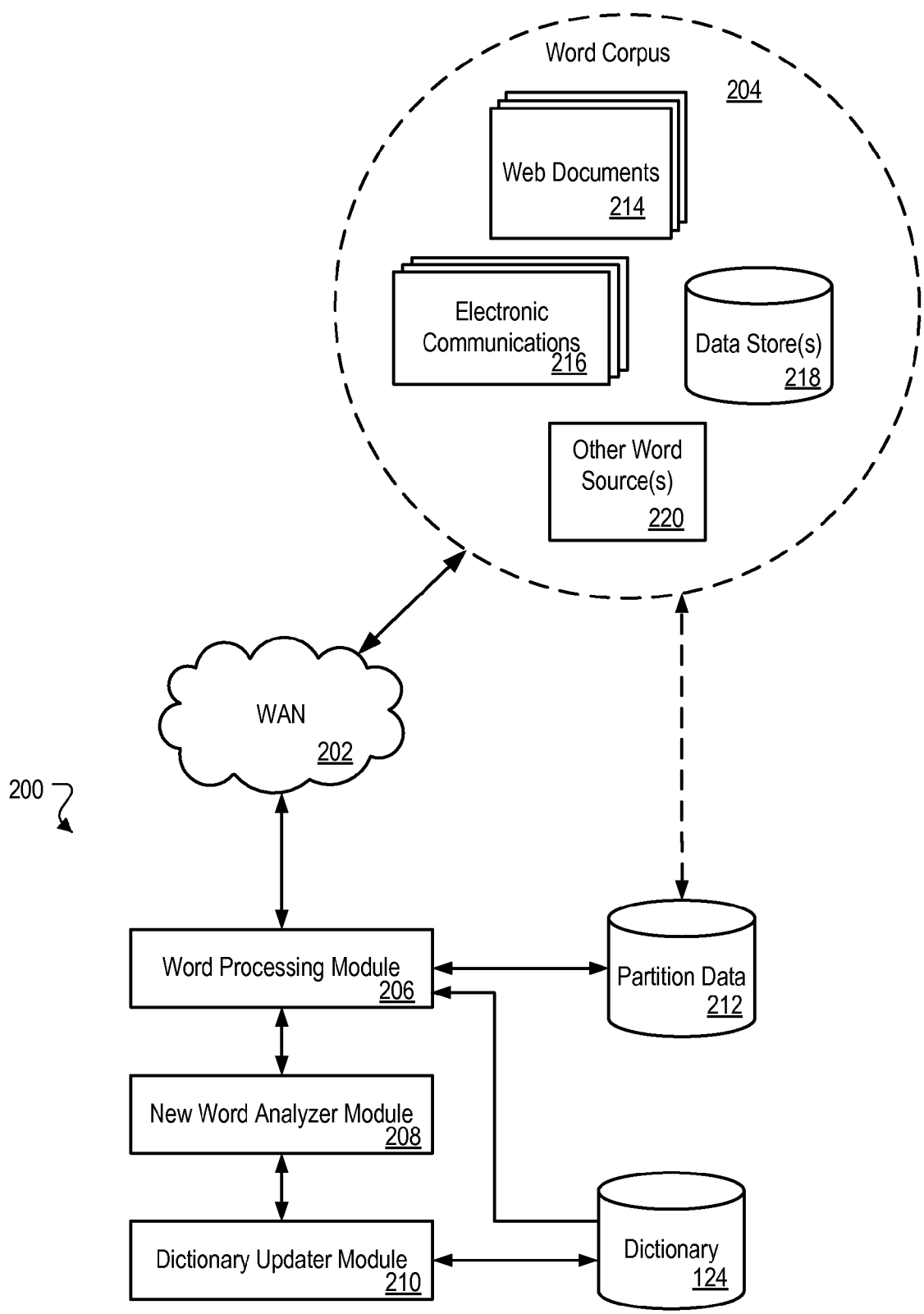
FIG. 2A is a block diagram of an example word detection system.

FIG. 2A is a block diagram of an example word detection system 200. The word detection system 200 includes a dictionary, e.g., a dictionary 124, a word processing module 206, a new word analyzer module 208, and a dictionary updater module 210. The word detection system can access a word corpus 204 over a network, e.g., a wide area network (WAN) 202, such as the Internet. The word detection system 200 can be configured to detect new words in the word corpus 204. For example, the word detection system 200 can identify new Chinese words defined by Hanzi characters from the word corpus 204. In some implementations, the word detection system 200 updates the dictionary 124 by storing the identified new words in the dictionary 124. For example, the word detection system 200 can add entries representing the new Chinese words into the dictionary 124. The dictionary 124 can then be provided to and/or accessed by computer devices utilizing an input method editor compatible with the dictionary 124.

The word processing module 206, the new word analyzer module 208, and the dictionary updater module 210 can be software and/or hardware processing modules configured to detect new words in the word corpus 204. An example software implementation of the modules includes instructions stored in a tangible computer-readable medium and executable by computer processing devices in data communication with the tangible computer-readable medium. Such instructions can include object code, compiled code, interpreted instructions, etc. In some implementations, the word processing module 206, the new word analyzer module 208, and the dictionary updater module 210 can be implemented in one or more networked server computers, e.g., a server farm, and can be configured to access and process a large word corpus, e.g., thousands or even millions of web-based documents. Other implementations can also be used.

The word corpus 204 includes words from various sources. An example word corpus can include web documents, such as web pages and files, query logs, blog, e-mail messages, or other data that includes word data. In the depicted example, the word corpus 204 can include Hanzi characters from web documents 214, electronic communications 216, data stores 218, and other word sources 220. The web documents 214 can include published web pages accessible over the WAN 202. For example, the word corpus 204 can include words from personal or company websites, profile pages in social networking websites, blog entries, online news articles, and/or other text published on the Internet. The electronic communications 216 can include network communications, such as email, short message service (SMS), search queries, or other communication methods. For example, the word corpus 204 can include text used in e-mail messages, SMS messages, and search queries. In some implementations, the word corpus 204 can also include words from other data stores 218, such as on-line dictionaries associated with other IME devices, user files, etc. In some examples, the word corpus 204 can also include words used in other word sources 220, such as in electronic books, electronic dictionaries, user manuals of various devices in electronic form, or any other electronic source of word data.

In some implementations, the word corpus 204 can include words in documents of one or more languages. For example, a single document in the corpus 204 may include more than one language (e.g., an editorial in a Chinese newspaper about English politics can include both Chinese and English). In some implementations, the word processing module 206 can extract characters for a particular language, e.g., Hanzi characters, from the word corpus 204 for word detection.

In some implementations, the word processing module 206 can include a Hanzi character processing module. In one example, the Hanzi character processing module can process the Hanzi characters in the word corpus 204. In some examples, the word processing module 206 can include processing modules to process other logographic languages, such as a Japanese character processing module, a Korean character processing module, and/or other logographic character processing modules.

In some implementations, the word detection system 200 includes a partition data store 212. The partition data store 212 can include a copy of the word corpus 204 or a large portion of the word corpus, e.g., copies of web pages crawled by software agents, and the word processing module 206 can partition data stored in the partition data store 212. For example, the word processing module 206 can partition data related to the word corpus 204 into a training corpus and a development corpus. In some implementations, data in the training corpus and the development corpus can be stored in the partition data store 212. In some implementations, more than two partitions can be generated and stored in the partition data store 212.

In some implementations, the word processing module 206 can identify documents in the word corpus 204 and store document identifiers, e.g., uniform resource locators (URL) according to partition data in the partition data store 212. In these implementations, the partition data store 212 need not include a copy of the word corpus 204 or a copy of a large portion of the word corpus 204. Other data storage and/or allocation techniques for managing the word corpus 204 can also be used.

The word processing module 206 can include a language model. For example, the word processing module 206 can utilize the data in the word corpus 204 to generate an n-gram language model. The n-gram language model can include probabilities of a sub-sequence of n words from given sequences. The n-gram language model can include a unigram language model with n=1, a bigram language model with n=2, and/or a trigram language model with n=3, or other n-gram models. In certain implementations, the word processing module 206 can generate the n-gram language model for one or more of the partitioned data sets in the partition data store 212, e.g., the training corpus.

In some implementations, the word processing module 205 can identify words in the word corpus 204 without delimiters. For example, the word processing module 206 can use the dictionary 124 and one or more existing language models to identify words in the word corpus 204. In one example, for a given sentence in the word corpus 204, the word processing module 206 can identify one or more combinations of words that form the sentence, Based on the language model, the word processing module 206 can, for example, rank the combinations and select a combination of words with the highest rank.

The word processing module 206 can compare the words in the training corpus and the words in the dictionary 124 to identify one or more potential new words, e.g., candidate words that appear in the training corpus and that are not in the dictionary 124. In some examples, the system 200 can verify whether a candidate word is a new word using the data in the partitioned data store 212. The word processing module 206 determines a first probability of the candidate word and the probabilities of words constituting the candidate word based on, for example, the n-gram language model in a training corpus (e.g., the training corpus), and a second probability based on, for example, a number of occurrences of the candidate word in the development corpus and the total number of words in the development corpus.

Using the first and second probabilities, the new word analyzer module 208 can determine whether the candidate word is a new word. In one example, the new word analyzer module 208 can use the first and second probabilities to determine whether an uncertainty in the development corpus, e.g., an entropy value, decreases with respect to the candidate word. In some implementations, the new word analyzer module 208 generates first and second entropy-related values based on the first and the second probabilities. For example, the first entropy-related value and the second entropy-related value may represent the uncertainty of the language models with and without the candidate word, respectively. In some implementations, the new word analyzer module 208 determines that the candidate word is a new word if the first entropy-related value is smaller than the second entropy-related value. The reduction of entropy can be indicative of an information gain (IG) resulting from correctly detecting the new word.

If the candidate word is determined to be a new word, the new word analyzer module 208 can notify the dictionary updater module 210 to update the dictionary 124 with the new word.

In some implementations, the entropy-related values can be an approximation of the actual entropy values. For example, the number of words in the training corpus and the development corpus may vary slightly by including the candidate word in the language model, e.g., the word "全球" may be counted as one word, or may be counted as two words if the constituent characters 台 and 球 are considered separately.

In one implementation, the new word analyzer module 208 can generate the entropy-related values using fixed sizes of the training corpus and the development corpus, e.g., by adjusting the probabilities for only a candidate word and the constituent words that define the candidate word. The entropy-related values are thus a close approximation of the actual entropy values. The new word analyzer module 208 can use the entropy-related values as the entropy values of the training corpus and/or the development corpus.

Figure 2B:
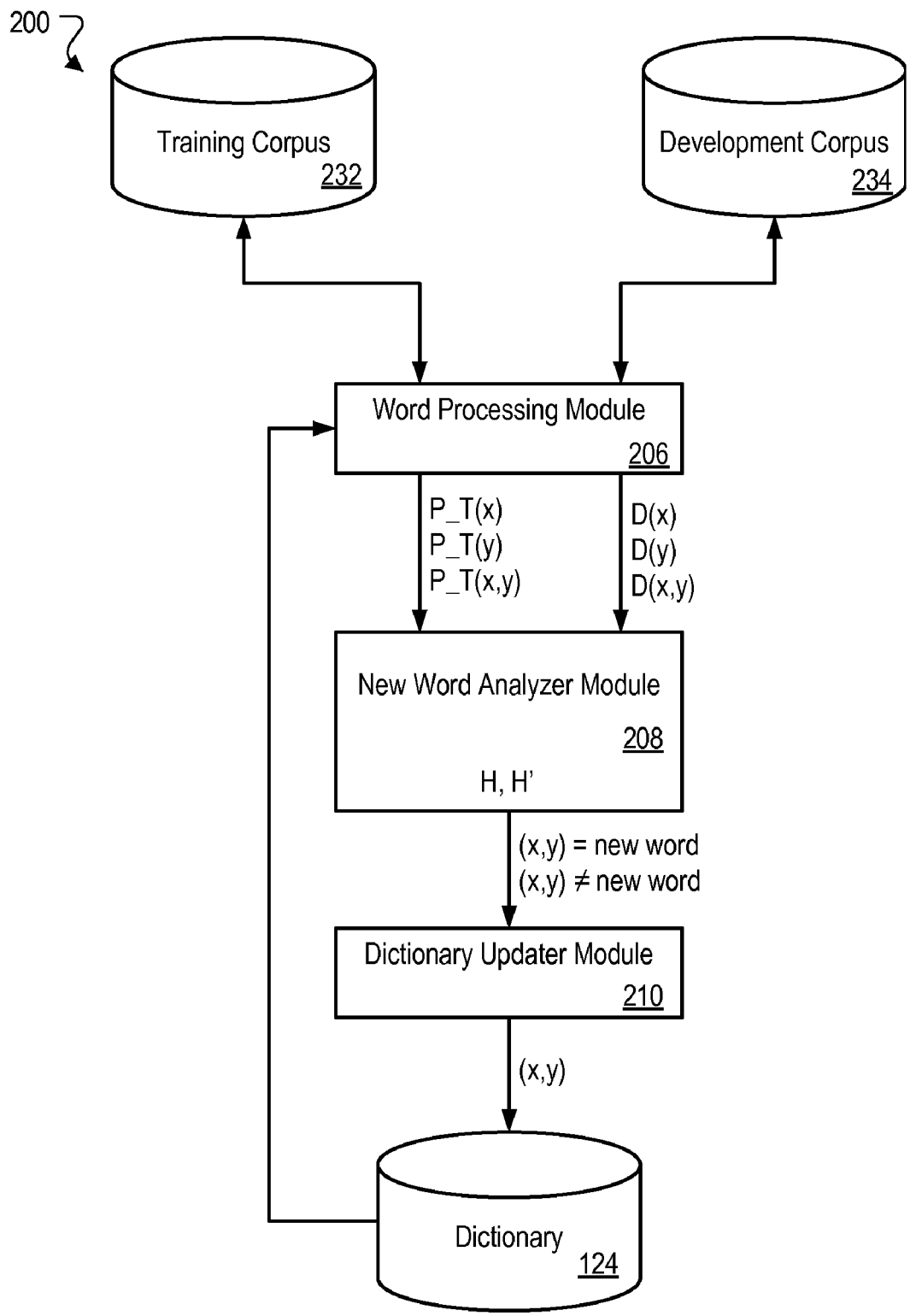
FIG. 2B is a block diagram of an example implementation of the system of FIG. 2A.

FIG. 2B is a block diagram of an example implementation of the system 200 of FIG. 2A. As shown in FIG. 2B, the system 200 includes a training corpus 232 and a development corpus 234. In some implementations, the word processing module 206 partitions the word corpus 204 to generate the training corpus 232 and the development corpus 234. For example, the training corpus 232 and the development corpus 234 can be stored or represented in the partition data store 212.

In some implementations, the word processing module 206 can include a segmentation module that segments raw sentences without spaces between words into word sequences. The segmentation module in the word processing module can, for example, utilize a dictionary and language models to generate the segments of word sequences.

As discussed above, the word processing module 206 can include an n-gram language model in the training corpus 232. In some implementations, the word processing module 206 can identify a candidate word by combining two or more existing words in the training corpus 232. For example, the word processing module 206 can identify a candidate word (x, y) by combining two existing words x and y.

In some implementations, the system 200 can utilize word data from the word corpus 204, e.g., web page data in the training corpus 232 and the development corpus 234, to determine whether the candidate word is a new word. For example, the word processing module 206 can generate an n-gram language model from data stored in the training corpus 232 to include an identified candidate word (x, y). The unigram model can include the probabilities of the candidate word, P(x, y), and the word processing module 206 can also determine the corresponding probabilities P(x) and P(y) of the words x and y that constitute the candidate word xy. Additionally, the word processing module 206 generates a word count value of the candidate word, D(x, y), and word count values of constituent words, D(x) and D(y) from the development corpus 234. For example, D(x), D(y), and D(x, y) may be the number of occurrences of x, y, and (x, y), respectively in the development corpus 234. Using the word count values, the system 200 can determine probabilities of x, y, and (x, y) in the development corpus 234. For example, the probability of (x, y) in the development corpus 234 can be determined by $$\frac{D(x, y)}{\|D\|},$$

where $\|D\|$ is the total number of words in the development corpus 234.

After receiving the probabilities p(x), p(y), and p(x, y), and the word count values D(x), D(y), and D(x, y), the new word analyzer module 208 determines whether the candidate word is a new word. In some implementations, the new word analyzer module 208 can determine that the candidate word is a new word if the uncertainty of the development corpus 234 decreases by including the candidate word as a new word. In some examples, an entropy value can be used to measure an uncertainty in the development corpus 234. For example, the entropy value of the development corpus 234 can be determined by $$H = -\sum_{w \in V} \frac{D(w)}{\|D\|} \cdot \log p(w),$$

where V is the entire set of words considered to compute the entropy H, w is a word in the development corpus 234, p(w) is the probability of the word in the development corpus, and D(w) is the number of occurrences of w in the development corpus.

In some implementations, the new word analyzer module 208 can generate entropy values H and H' for the development corpus 234, where H and H' are the entropy values of the development corpus 234 without and with, respectively, including the candidate word in the language models. In some implementations, the new word analyzer module 208 generates the actual entropy values H and H' using the actual sizes of a corpus without and with the candidate word, respectively. In some implementations, the new word analyzer module 208 can also use one or more entropy-related values that can approximate the actual entropy values. For example, the new word analyzer module 208 can generate H' using the size of the corpora 232, 234 without the candidate word. Although the size of the training and development corpora 232, 234 may decrease after including (x, y) as a new word in the vocabulary, the difference may be negligible for computing the entropy of the corpora 232, 234 with the candidate word (x, y). For example, if a sequence of n constituent words W1W2 ... Wn is considered a potentially new word, the size of the corpus decreases only by the number of occurrences of W1W2 ... Wn, e.g., m, multiplied by n−1, e.g., m*(n−1).

By comparing H and H', the new word analyzer module 208 can determine whether the candidate word is a new word. For example, if H'−H<0, then the new word analyzer module 208 may determine that the candidate word is a new word because the entropy value of the development corpus 234 is reduced by including the candidate word.

In some examples, the new word analyzer module 208 compares the entropy values H and H' using the probabilities p(x), p(y), and p(x, y), and the word count values D(x), D(y), and D(x, y). Because the word frequencies of words other than the candidate word and the constituent words are not affected by the addition of the candidate word, the formula for generating a difference between H and H' can be generated using a simplified formula. By canceling equal terms, the following formula can be derived to compute the difference between H and H'

$$Z = H' - H = -\left[\frac{D(x, y)}{\|D\|} \cdot \log p'(x, y) + \frac{D(x) - D(x, y)}{\|D\|} \cdot \log p'(x) + \frac{D(y) - D(x, y)}{\|D\|} \cdot \log p'(y)\right] + \left[\frac{D(x)}{\|D\|} \cdot \log p(x) + \frac{D(y)}{\|D\|} \cdot \log p(y)\right]$$

where p'(x), p'(y), p'(x, y), p(x), and p(y) are probabilities of the language models of the training corpus 232. The values of p'(x), p'(y), p'(x, y) are the probabilities of x, y, and (x, y), respectively, in the language model when the sequence of characters xy is considered a candidate word. Conversely, the values of p(x) and p(y) are probabilities of x and y, respectively, in the language model when the sequence of characters xy is not considered a candidate word. Thus, the value of p(x)>p'(x), and the value of p(y)>p'(y), as each occurrence of the sequence xy increases the respective probabilities of p(x) and p(y).

In an implementation, the new word analyzer module 208 can determine that the candidate word (x, y) is a new word if Z<0, which is equivalent to the condition:

$$\frac{D(x, y)}{\|D\|} \cdot \log\frac{p'(x, y)}{p'(x) \cdot p'(y)} > \frac{D(x)}{\|D\|} \cdot \log\frac{p(x)}{p'(x)} + \frac{D(y)}{\|D\|} \cdot \log\frac{p(y)}{p'(y)}$$

Accordingly, the candidate word (x, y) is determined to be a new word if the above inequality is true.

In some implementations, the probabilities p(x), p(y), p'(x), and p'(y) are represented using number of occurrences of x, y, and (x, y) in the training corpus 232 divided by the total number of words in the training corpus 232. For example, $$p'(x) = \frac{T(x) - T(x, y)}{\|T\|} = p(x) - p(x, y),$$

$$p'(y) = \frac{T(y) - T(x, y)}{\|T\|} = p(y) - p(x, y),$$

$$p(x) = \frac{T(x)}{\|T\|}, \text{ and}$$

$$p(y) = \frac{T(y)}{\|T\|},$$

where T(x), T(y), and T(x, y) are the number of occurrences of x, y, and (x, y), respectively, in the training corpus 232, and ||T|| is the total number of words in the training corpus 232. Thus, the new word analyzer module 208 can evaluate the above inequality according to the following inequality:

$$\frac{D(x, y)}{\|D\|} \cdot \log\frac{p'(x, y)}{p'(x) \cdot p'(y)} >$$

$$\frac{D(x)}{\|D\|} \cdot \log\frac{p(x)}{p(x) - p(x, y)} + \frac{D(y)}{\|D\|} \cdot \log\frac{p(y)}{p(y) - p(x, y)}$$

This inequality can be rewritten as:

$$\frac{D(x, y)}{\|D\|} \cdot \log\frac{p'(x, y)}{p'(x) \cdot p'(y)} >$$

$$\frac{D(x)}{\|D\|} \cdot \log\frac{T(x)}{T(x) - T(x, y)} + \frac{D(y)}{\|D\|} \cdot \log\frac{T(y)}{T(y) - T(x, y)}$$

to determine whether the candidate word is valid.

In an implementation, the new word analyzer module 208 can generate a first value using a word frequency of the candidate word in the development corpus 234

$$\left(\text{e.g., } \frac{D(x, y)}{\|D\|}\right),$$

and the word frequencies of the candidate word and the constituent words in the training corpus 232 (e.g., p(x), p(y), and p(x, y)). A first entropy-like value V1 based on these values can be calculated based on the formula:

$$V1 = \frac{D(x, y)}{\|D\|} \cdot \log\frac{p(x, y)}{p(x) \cdot p(y)}.$$

Similarly, the new word analyzer module 208 can generate a second entropy value using a word frequency of the constituent words in the development corpus 234

$$\left(\text{e.g., } \frac{D(x)}{\|D\|} \text{ and } \frac{D(y)}{\|D\|}\right),$$

and the word frequencies of the candidate word and the constituent words in the training corpus 232. A second entropy-like value Vs based on these values can be calculated based on the formula:

$$V2 = \frac{D(x)}{\|D\|} \cdot \log\frac{p(x)}{p(x) - (x, y)} + \frac{D(y)}{\|D\|} \cdot \log\frac{p(y)}{p(y) - p(x, y)}.$$

In some implementations, the new word analyzer module 208 determines that the candidate word is a new word if V1>V2. Other inequalities can also be used to be more inclusive or less inclusive of new words, e.g., V1>S*V2, where S is a scalar value. The scalar value can be fixed, e.g., 0.9, or adjusted according to applications.

The dictionary updater module 210 receives data indicative of the determination from the new word analyzer module 208. In some implementations, if the new word analyzer module 208 determines that the candidate word is a new word, then the dictionary updater module 210 can add the new word into the dictionary 124.

The system 200 may process the word corpus 204 and process multiple candidate words on a scheduled basis. For example, the process of detecting new words in the corpus can be implemented on a daily, weekly, or monthly basis. Other triggering events can also be used; e.g., a new word detection process can be performed for a web-based input method editor if an unrecognized word is received as input with enough frequency to be statistically significant.

Figure 3:
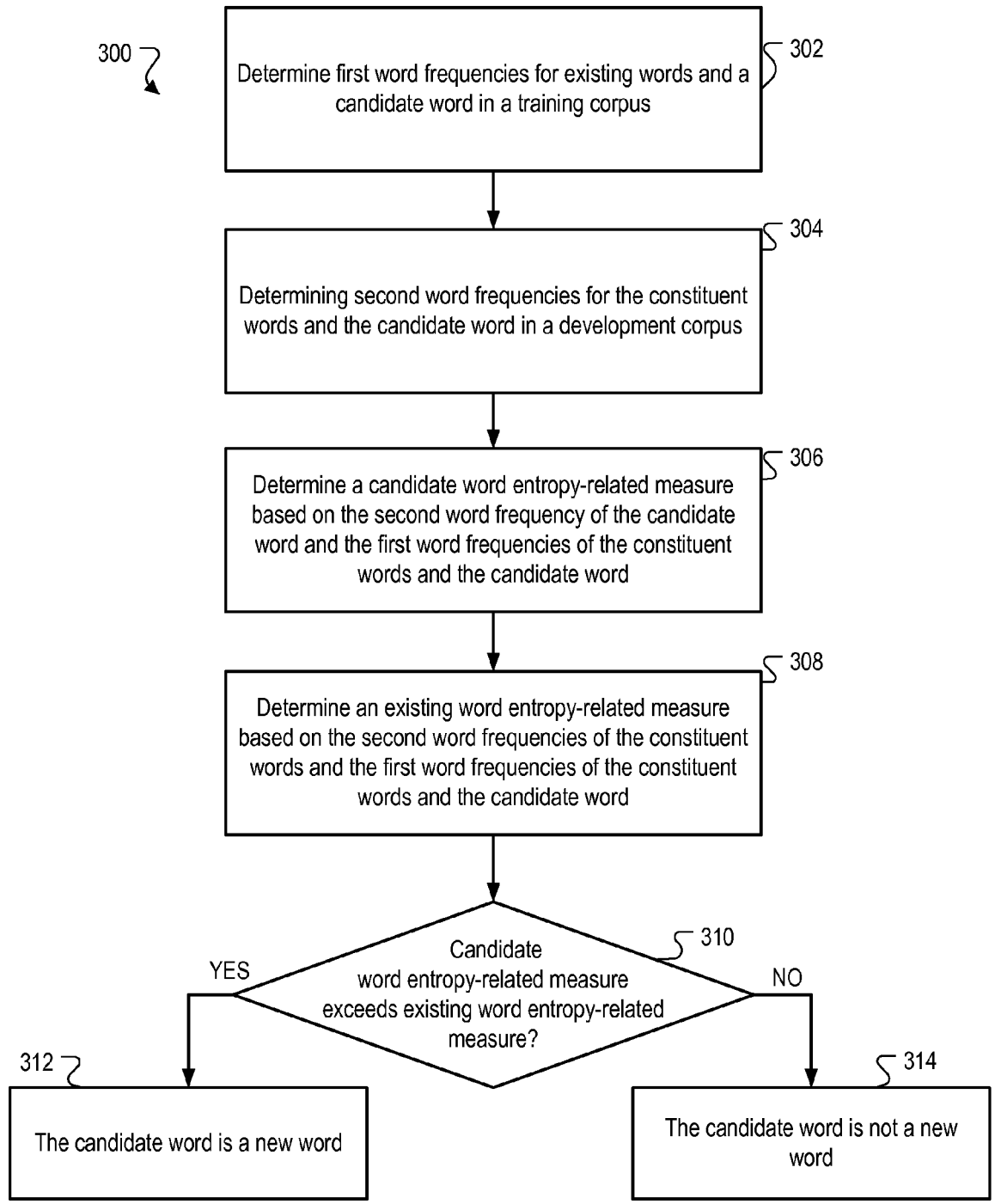
FIG. 3 is a flow chart of an example process for identifying new words in a word corpus.

FIG. 3 is a flow chart of an example process 300 for identifying new words in a word corpus (e.g., the word corpus 204). The process 300 can, for example, be implemented in a system that includes one or more computers. For example, the word detection system 200 can be used to perform some or all of the operations in the process 300.

The process 300 begins with determining first word frequencies for existing words and a candidate word in a training corpus (302). The candidate word can be defined by a sequence of constituent words, and each constituent word can be an existing word in a dictionary. For example, the word processing module 206 can determine probabilities (e.g., p(x), p(y), and p(x, y)) of a candidate word (e.g., (x, y)) and the existing words that constitute the candidate word (e.g., x and y) in the training corpus 232. In some implementations, the word processing module 206 can generate an n-gram language model in the training corpus 232 to determine the word frequencies.

Next, the process 300 determines second word frequencies for the constituent words and the candidate word in a development corpus (304). For example, the word processing module 206 can determine word count values of the identified new word and the constituent words in the development corpus 234 (e.g., D(x, y), D(x), and D(y)). In some implementations, the word frequency of a word in the development corpus 234 can be determined by dividing the word count of the word in the development corpus 234 by the total number of words in the development corpus 234. For example, the word processing module 206 can determine a word frequency of w in the development corpus by computing $$\frac{D(w)}{\|D\|}.$$

After determining the word frequencies, the process 300 determines a candidate word entropy-related measure based on the second word frequency of the candidate word and the first word frequencies of the constituent words and the candidate word (306). For example, the new word analyzer module 208 can determine the candidate word entropy-related measure V1 using D(x, y), p(x), p(y), and p(x, y).

The process 300 determines an existing word entropy-related measure based on the second word frequency of the constituent words and the first word frequencies of the constituent words and the candidate word (308). For example, the new word analyzer module 208 can determine an existing word entropy-related measure V2 using D(x), D(y), p(x), p(y), and p(x, y).

Next, the process 300 determines whether the candidate word entropy-related measure exceeds the existing word entropy-related measure (310). For example, the new word analyzer module 208 can compare V1 and V2 and determine whether V1 is greater than V2.

If the process 300 determines that the candidate word entropy-related measure exceeds the existing word entropy-related measure, the candidate word is determined to be a new word (312). For example, the new word analyzer module 208 can determine that the candidate word is a new word if V1>V2.

If the process 300 determines that the candidate word entropy-related measure does not exceed the existing word entropy-related measure, the candidate word is determined not to be a new word (314). For example, the new word analyzer module 208 can determine that the candidate word is not a new word if V1≦V2.

In some implementations, the entropy-related measures are determined by computing the entropy measure or by approximating the entropy measure using fixed sizes of the corpora as described with reference to FIGS. 2A-2B.

Figure 4:
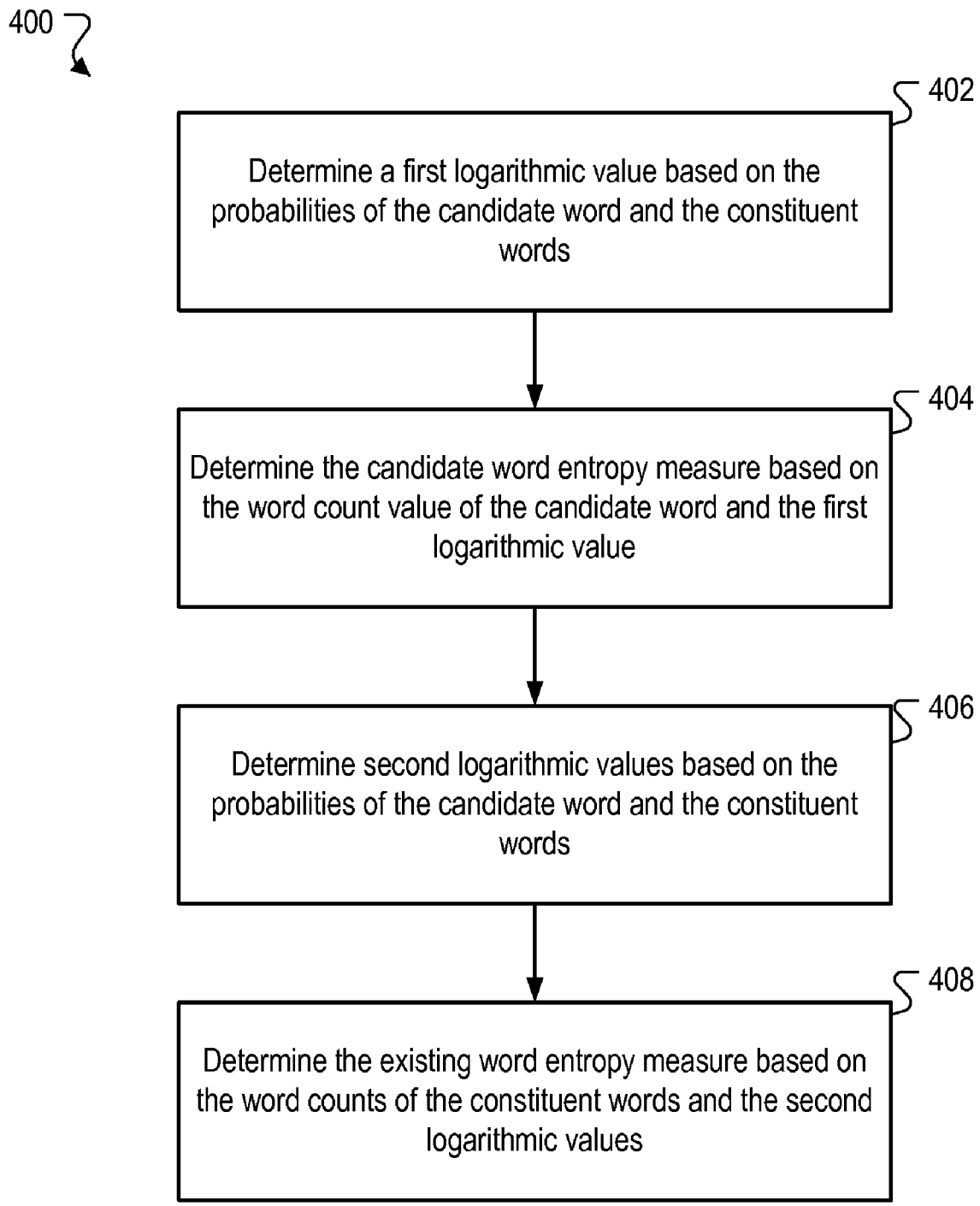
FIG. 4 is a flow chart of an example process for determining entropy-related measures for candidate words and existing words.

FIG. 4 is a flow chart of an example process 400 for determining entropy-related measures for candidate words and existing words. For example, the process 400 can be implemented in a system that includes one or more computers. For example, the word detection system 200 can be used to perform some or all of the operations in the process 400.

The process 400 begins with determining a first logarithmic value based on the probabilities of the candidate word and the constituent words (402). For example, the new word analyzer module 208 can determine a first logarithmic value using p(x), p(y), and p(x, y). In one example, the first logarithmic value can be $$\log \frac{p(x, y)}{p(x) \cdot p(y)}$$

Next, the process 400 determines the candidate word entropy measure based on the word count value of the candidate word and the first logarithmic value (404). For example, the new word analyzer module 208 can use the word count of the candidate word D(x, y) and the first logarithmic value to generate the value V1.

The process 400 determines second logarithmic values based on the probabilities of the candidate word and the constituent words (406). For example, the new word analyzer module 208 can determine second logarithmic values using p(x), p(y), and p(x, y). For example, the second logarithmic values can include $$\log \frac{p(x)}{p(x) - p(x, y)} \text{ and } \log \frac{p(y)}{p(y) - p(x, y)}$$

Next, the process 400 determines the existing word entropy measure based on the word counts of the constituent words and the second logarithmic values (408). For example, the new word analyzer module 208 can use the word count of the candidate word D(x), D(y) and the second logarithmic value to generate the value V2.

Figure 5:
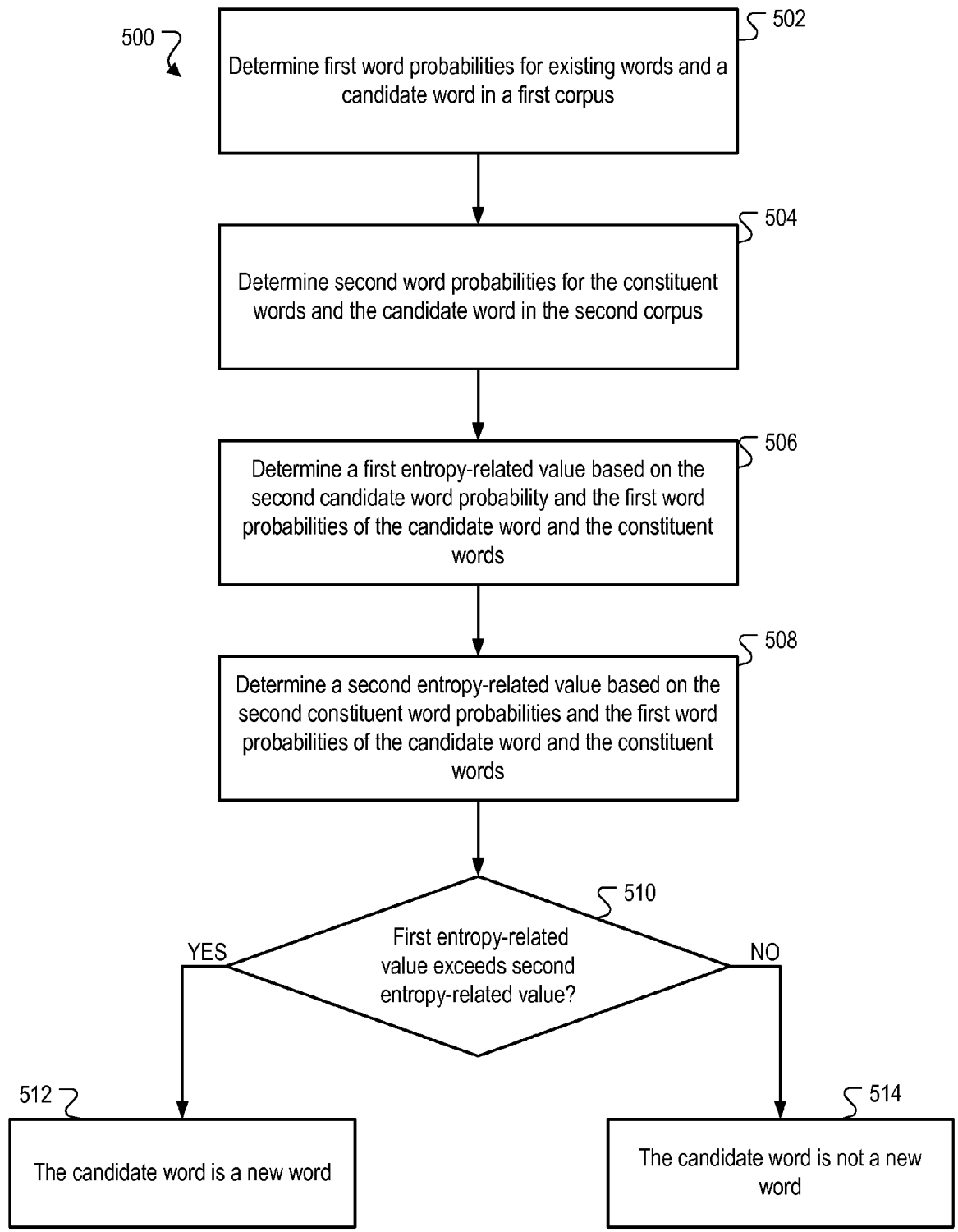
FIG. 5 is a flow chart of another example process for identifying new words in a word corpus.

FIG. 5 is a flow chart of another example process 500 for identifying new words in a word corpus. For example, the process 500 can be implemented in the system 200. The process 500 begins with determining first word probabilities for existing words and a candidate word in a first corpus (502). For example, the word processing module 206 can determine p(x), p(y), and p(x, y) in the training corpus 232.

The process 500 determines second word probabilities for the constituent words and the candidate word in the second corpus (504). The candidate word can be defined by a sequence of constituent words, and each constituent word can be an existing word in a dictionary. For example, the word processing module 206 can determine the probabilities of the constituent words, x and y, and the candidate word (x, y) in the development corpus 234. For example, the word processing module 206 can use D(x), D(y), and D(x, y) in the development corpus 234, and ∥D∥ to determine the probabilities of x, y, and (x, y) in the development corpus 234.

Next, the process 500 determines a first entropy-related value based on the second candidate word probability and the first word probabilities of the candidate word and the constituent words (506). For example, the new word analyzer module 208 can determine V1 using D(x, y) and p(x), p(y), and p(x, y).

The process 500 determines a second entropy-related value based on the second constituent word probabilities and the first word probabilities of the candidate word and the constituent words (508). For example, the new word analyzer module 208 can determine V2 using D(x), D(y), and p(x), p(y), and p(x, y).

After determining the entropy-related values, the process 500 determines whether the first entropy-related value exceeds the second entropy-related value (510). For example, the new word analyzer module 208 can determine whether V1>V2.

If the process 500 determines that the first entropy-related value V1 exceeds the second entropy-related value V2, the candidate word is determined to be a new word (512). For example, the new word analyzer module 208 can determine that the candidate word is a new word if V1>V2.

If the process 500 determines that the first entropy-related value does not exceed the second entropy-related value, the candidate word is determined not to be a new word (514). For example, the new word analyzer module 208 can determine that the candidate word is not a new word if V1≦V2.

Figure 6:
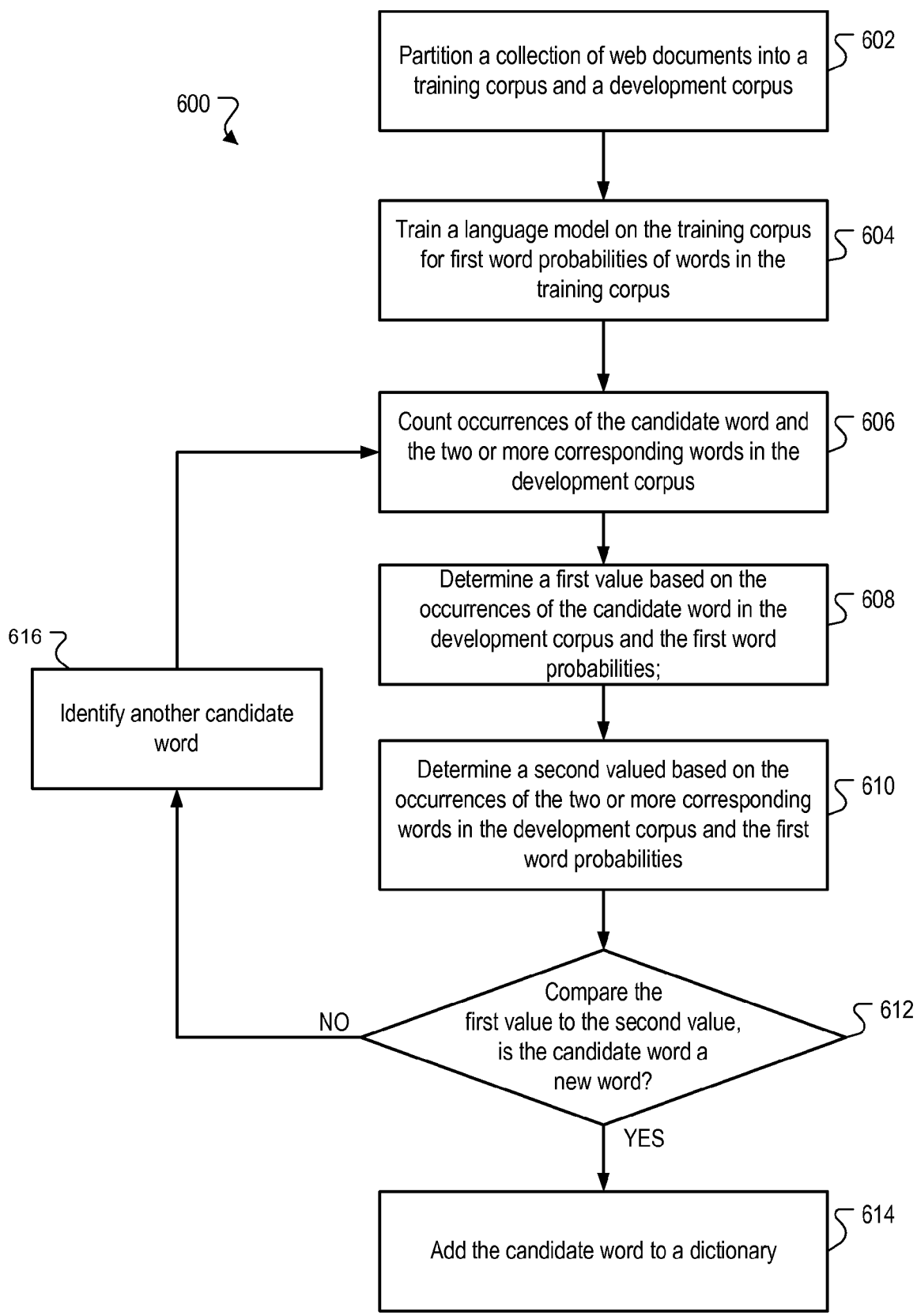
FIG. 6 is a flow chart of another example process for identifying new words in a word corpus based on word probabilities from another word corpus.

FIG. 6 is a flow chart of another example process 600 for identifying new words in a word corpus based on word probabilities from another word corpus. For example, the process 400 can be implemented in a system that includes one or more computers.

The process 600 begins with partitioning a collection of web documents into a training corpus and a development corpus (602). For example, the word processing module 206 can partition the word corpus 204 into the training corpus 232 and the development corpus 234.

Next, the process 600 trains a language model on the training corpus for first word probabilities of words in the training corpus (604). For example, the word training module 206 can train an n-gram language model of the training corpus 232 and obtain probabilities of words (e.g., p(x), p(y), and p(x, y)) in the training corpus 232.

The process 600 counts occurrences of the candidate word and the two or more corresponding words in the development corpus (606). For example, the word processing module 206 can count occurrences of the candidate word D(x, y) and the constituent words of the candidate word D(x) and D(y) in the development corpus 234.

Next, the process 600 determines a first value based on the occurrences of the candidate word in the development corpus and the first word probabilities (608). For example, the new word analyzer module 208 determines VI based on D(x, y) and p(x), p(y), and p(x, y).

The process 600 determines a second value based on the occurrences of the two or more corresponding words in the development corpus and the first word probabilities (610). For example, the new word analyzer module 208 determines V2 based on D(x) and D(y), and p(x), p(y), and p(x, y).

After determining the first and second values, the process 600 determines whether the candidate word is a new word by comparing the first value to the second value (612). For example, the new word analyzer module 208 can compare V1 and V2. If the process 600 determines that the candidate word is a new word, then the process 600 adds the candidate word to a dictionary (614). For example, the dictionary updater module 210 can add the new word to the dictionary 124. If the process 600 determines that the candidate word is not a new word, then the process 600 identifies another candidate word (616) and the step 606 is repeated. For example, the word processing module 206 can identify another candidate word from the word corpus 204.

Although the examples of detecting a new word is described above with reference to two existing words, the word detection system 200 can detect new words constituting more than two existing words. For example, the word detection system 200 can identify a candidate word (x, y, z) that constitutes three existing words, x, y, and z. The new word analyzer module 208 can generate a first entropy related value V1 by computing $$V1 = \frac{D(x, y, z)}{\|D\|} \cdot \log \frac{p(x, y, z)}{p(x) \cdot p(y) \cdot p(z)}$$

and a second entropy related value V2 by computing $$V2 = \frac{D(x)}{\|D\|} \cdot \log \frac{p(x)}{p(x) - p(x, y, z)} + \frac{D(y)}{\|D\|} \cdot \log \frac{p(y)}{p(y) - p(x, y, z)} + \frac{D(z)}{\|D\|} \cdot \log \frac{p(y)}{p(z) - p(x, y, z)}.$$

If V1>V2, the new word analyzer module 208 can determine that the candidate word (x, y, z) is a new word and the dictionary updater module 210 can store the new word in the dictionary 124. For example, the system 200 can identify the following new three- and four-character words/phrases that have been introduced into a language lexicon: "丁俊晖"(ding junhui); "本赛季"(this season); "世锦赛"(world championship); "季后赛"(play off); "范甘迪"(Van Cundy); "国际足联"(FIFA); "反倾销"(anti dumping of low-priced), "净利润"(net profit); "证监会"(SEC); "国资委"(China federal estate committee); "美联储"(FED); and "非流通股"(Non-tradable shares).

In some implementations, a computer system can include one or more topic dictionaries that are related to one or more specific topics. For example, the dictionary 124 of FIG. 1B can include one or more topic dictionaries, and each topic dictionary can correspond to a particular topic and include topic words related to the particular topic. Examples of specific topics can include a sports topic, a music topic, a legal topic, a medical topic, etc. A topic dictionary related to a sports topic, for example, can include words and phrases related to the sport, e.g., "soccer," "football," "goal," "red flag," etc. Some of the words can be existing words in a language dictionary, e.g., "soccer," and some of the words can be new words, e.g., a name of a new player, the name of a new venue, etc.

In some implementations, topic words can be identified from the new words and/or existing words. In one example, one or more of the new words can be classified to be related to a specific topic after the new words are identified using the system 200. In some implementations, a topic word identification system can identify topic words from the word corpus 204. The identified topic words can be included in one or more of the topic dictionaries.

Figure 7A:
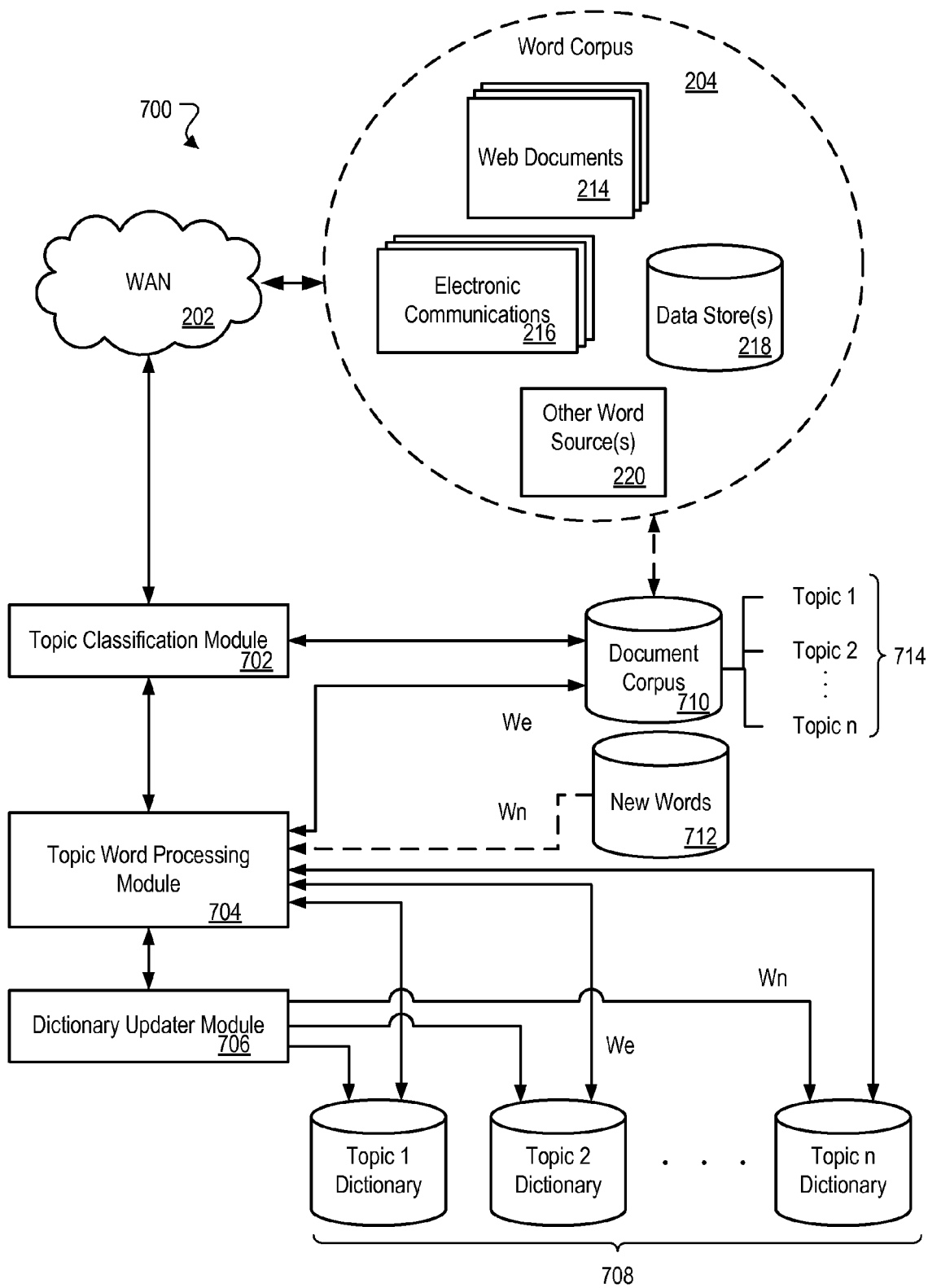
FIG. 7A is a block diagram of an example topic word identification system.

FIG. 7A is a block diagram of an example topic word identification system 700 for identifying topic words. The topic word identification system 700 includes a topic classification module 702, a topic word processing module 704, a dictionary updater module 706, and topic dictionaries 708. The topic classification module 702, topic word processing module 704, and the dictionary updater module 706 can be integrated on one or more computers, e.g., either a single computer or one or more computers in communication over a network, such as a WAN 202. Likewise, through the WAN 202, the topic classification module 702 can retrieve documents in the word corpus 204, e.g., document corpus 710. In some examples, the topic word identification system 700 can identify topic words in the word corpus 204 and update the identified topic words to the topic dictionaries 708.

The document corpus 710 can include documents from the word corpus 204, e.g., document corpus 710 can include a copy of the word corpus 204 or a large portion of the word corpus 204, e.g., copies of web pages crawled by software agents. In this example, the document corpus 710 includes n topics 714, and each topic includes topic-related documents, e.g., a topic document corpus, from the document corpus 710. For example, the document corpus 710 can include sports-related documents, medical-related documents, etc., and a sports topic can include the sports-related documents as a sports topic document corpus; a medical topic can include the medical-related documents as a medical topic document corpus, etc. In some implementations, each of the topics 714 may be predefined in the system 700. Additionally, some of the topics can also be sub-topics of another topic. For example, topics "tennis" and "basketball" can be sub-topics of a topic "sports."

In some implementations, the topic classification module 702 clusters the documents in the document corpus 710 to generate topic document clusters. For example, the topic classification module 702 can cluster the documents related to one of the topics 714 to form a topic document cluster of the topic. The topic classification module 702 can use different topic detection methods to classify the documents. For example, the topic classification module 702 can use some clustering techniques (e.g., singular value decomposition (SVD), K-means clustering, etc.) to generate clusters of topic documents from the documents in the document corpus 710. In an example, the topic classification module 702 can assign relevance values to each of the documents. In one implementation, the relevance values can be a similarity value of the document and a centroid of each of the topics 714. Based on the relevance values, the topic classification module 702 assigns the documents to a most relevant topic. Based on the document assignments, the topic classification module 702 can generate a topic document cluster for each of the topics 714.

The system 700 can include a new words data store 712. In some implementations, the new words data store 712 includes new words identified from the word corpus 204. For example, the new words data store 712 can store the new words identified using the system 200.

The topic word processing module 704 can select identified new words stored in the new words data store 712 and/or existing words identified in the document corpus 710 as candidate topic words for each of the topic document clusters and determine if a selected candidate word belongs to a topic. If a selected candidate topic word is determined to belong to a particular topic, then the corresponding topic dictionary 708 can be updated with the candidate topic word.

In one implementation, the topic word processing module 704 can select candidate topic words using the new words data store 712 and the topic dictionaries 708. The topic word processing module 704 can identify each of the words in corresponding topic documents as either a new word, a topic word, or a non-topic word. For example, a new word may be a word included in the new word data store 712 that may not be included in any of the topic dictionaries 708; a topic word may be a word that exists in the related topic dictionary; and a non-topic word may be an existing word that is not in the related topic dictionary. The topic word processing module 704 can select the new words and the non-topic words as the candidate topic words.

Based on the topic document clusters and the data stored in the topic dictionaries 708, the topic word processing module 704 can determine whether a candidate topic word is a topic word of one of the topic dictionaries 708. For example, if the topic word processing module 704 determines that the candidate topic word We, which is an existing word in the document corpus 710, is associated with topic 2, then the topic word processing module 704 can notify the dictionary updater module 706 to store the candidate topic word We in the topic 2 dictionary. Likewise, if the topic word processing module 704 determines that the candidate topic word Wn, which is a new word, is associated with topic n, then the topic word processing module 704 can notify the dictionary updater module 706 to store the candidate topic word Wn in the topic n dictionary.

Figure 7B:
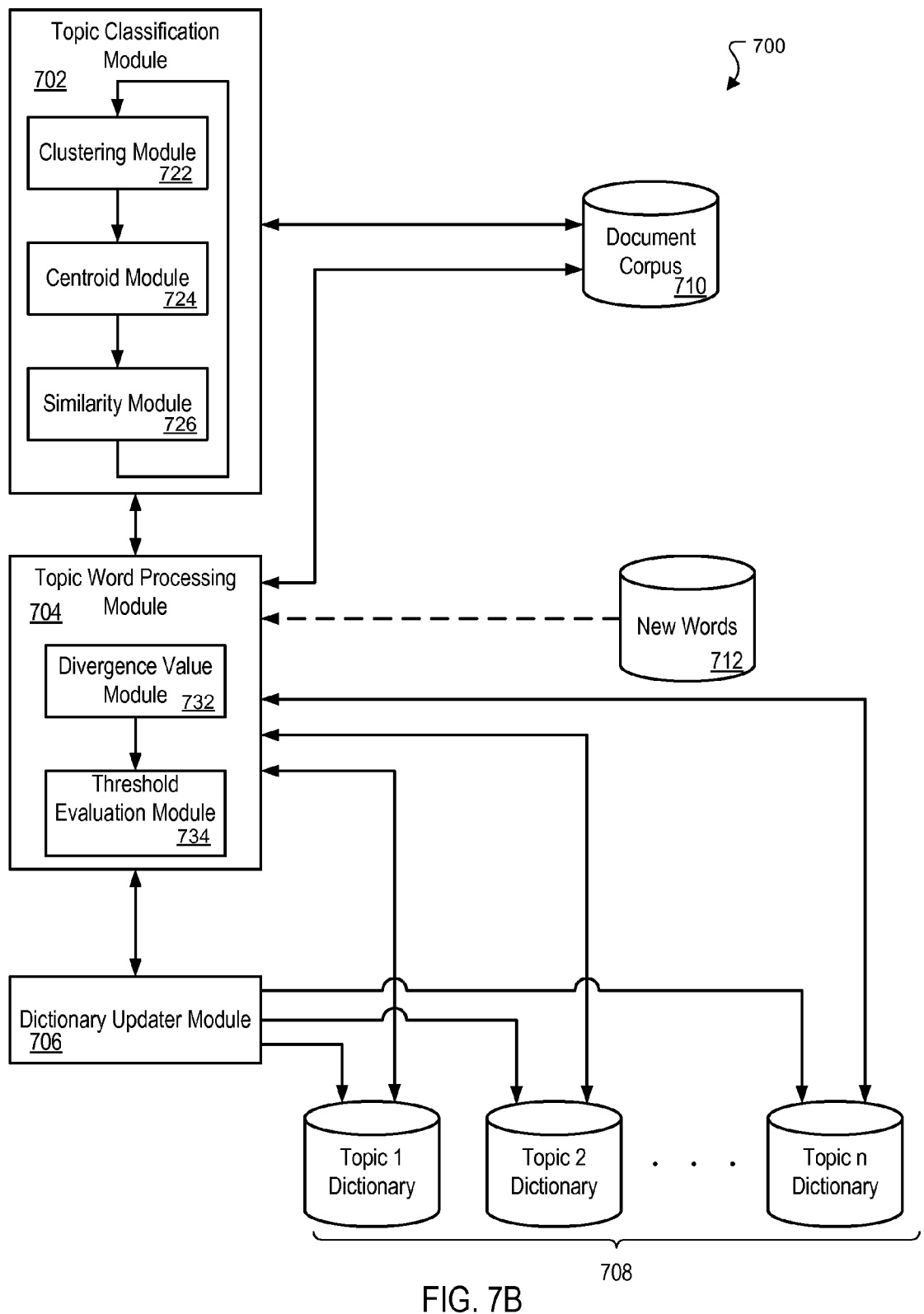
FIG. 7B is a more detailed block diagram of the system of FIG. 7A.

FIG. 7B is a more detailed block diagram of an example implementation of the system 700 of FIG. 7A. As shown in FIG. 7B, the topic classification module 702 includes a clustering module 722, a centroid module 724, and a similarity module 726. The topic classification module 702 can use the modules 722, 724 and 726 to generate topic document clusters in the document corpus 710.

The topic word processing module 704 includes a divergence value module 732 and a threshold evaluation module 734. The topic word processing module 704 can identify candidate topic words from the generated topic document clusters in the document corpus 710 and/or from the new words data store 712, and utilize the modules 732 and 734 to determine whether the candidate topic words are topic words.

In some implementations, the topic classification module 702 can generate a term frequency/inverse document frequency (TF-IDF) vector for each of the documents in the document corpus 710. For example, the clustering module 722 can determine the TF-IDF unigram frequency $m_{ij}$ for a word $w_j$ in a document j as according to the formula:

$$m_{ij} = f_j(w_i) \cdot \log \frac{D}{D_{w_i}}$$

in which D and $D_{wi}$ are the total number of documents and the number of documents containing $w_i$, respectively, and $f_j(w_i)$ is the frequency of $w_j$ in the document j. Using the TF-IDF frequencies of the words in the document j, the clustering module 722 can represent the document j by generating a TF-IDF vector $X_j$. For example, the document j can be represented as $$X_j = [m_{1j} \, m_{2j} \ldots m_{|V|j}]^T,$$

where |V| is the number of identified words in the system 700. In some implementations, the clustering module 722 can generate a co-occurrence matrix M using the document vectors $m_{ij}$.

Similarly, the topic classification module 702 can represent each of the topics using, for example, a centroid vector related to the TF-IDF vectors of the documents of the topic. For example, the centroid module 724 can determine topic centroids $Y_1, Y_2, \ldots, Y_n$ to represent the topics 1, 2, . . . , n, respectively. In some implementations, the centroid module 724 can determine the topic centroids by combining the TF-IDF vectors of the documents assigned to a topic. In one implementation, the centroid module 724 can determine a topic centroid $Y_k$ for the topic k ($T_k$) according to the formula:

$$Y_k = \sum_{X_i \in T_k} X_i$$

In some implementations, the similarity module 726 can determine similarity distances, e.g., cosine similarity distances, between a document $X_j$ and the centroids $Y_1, Y_1, \ldots Y_n$. A distance D(X, Y) between a document X and a topic centroid Y can be determined according to the formula:

$$D(X, Y) = 1 - \frac{X \cdot Y + \varepsilon \sum_{x_i > 0} x_i + \varepsilon \sum_{y_i > 0} y_i + \varepsilon^2}{(\|X\| + \varepsilon) \cdot (\|Y\| + \varepsilon)}$$

where $x_i$ is a component in the TF-IDF vector X, $y_i$ is a component in the TF-IDF vector Y, and $\varepsilon$ is a small positive real number less than 1.

Based on the distances between the documents and each of the centroids, the clustering module 722 can re-cluster the documents into document clusters by assigning the document to a nearest topic to the document. For example, the clustering module 722 compares the distances between the document and the topic centroids and determines a nearest topic centroids.

The topic classification module 702 can classify the topic documents iteratively. Initially, the topic classification module 702 can generate n initial clusters and n initial centroids of the clusters. In one example, the clustering module 722 can perform singular value decomposition (SVD) for the co-occurrence matrix M to identify the initial document clusters. For example, each of the documents may be assigned to one of the initial clusters as represented by $C^0(X_i)$. In other implementations, the initial clusters can also be generated by randomly assigning the documents to the topics. Based on the initial document clusters, the centroid module 724 can generate the initial centroids by computing:

$$Y_j^0 = \sum_{i: C^0(X_i) = j} X_i \text{ for } j = 1, 2, 3, \dots, n$$

Using the initial centroids, the similarity module 726 can generate similarity distances $D(X, Y)$ between each of the centroids and each of the documents.

After initialization, the clustering module 722 can reassign the documents based on a currently nearest topic centroid in each iteration. In one example, if $D(X_{14}, Y_2)$ is, in a current iteration, the smallest among all $D(X_{14}, Y_j)$ for $j=1,2,\ldots,n$, then the clustering module 722 can assign the document 14 to the topic 2. After reassigning the documents, the centroid module 724 updates the centroids of the topics based on the new assignment. For example, in step n, the centroid module 724 can compute the new centroid by computing:

$$Y_j^n = \sum_{i: C^n(X_i) = j} X_i \text{ for } j = 1, 2, 3, \dots, n$$

Using the updated centroids, the similarity module 726 can determine new similarity distances between the documents and the updated centroids. Then, the determined distances can be used to reassign the documents in the next iteration. For example, the topic classification module 702 can repeatedly perform operations of assigning the documents to the clusters, updating of the topic centroids, and computing the distances between the updated centroids and the documents until the topic document clusters converge. For example, in a current iteration (e.g., in iteration n), the clustering module 722 can assign the documents to a topic using the distance computed in a previous step (e.g., in iteration n−1). In one example, the clustering module 722 can reassign $X_i$ to a cluster $C^n(X_i)$ (e.g., an assigned cluster of $X_i$ in the n-th step) using a formula $$C^n(X_i) = \underset{j=1}{\overset{n}{\arg\min}} D(X_i, Y_j^{n-1})$$

The topic classification module 702 can repeat the operations until positions of the centroids converge. In one example, the topic classification module 702 can determine that the positions of a centroid $Y_j$ converges if $$\|Y_j^n - Y_j^{n-1}\| < L,$$

where L is a positive real number.

In another implementation, documents can be assigned to initial clusters according to human annotations, e.g., annotations or metadata related to topic identifications in another implementation, a topic keyword list can be used to seed each topic cluster for identification of document and topic clusters. Other clustering techniques can also be used.

After generating the topic document clusters, the topic word processing module 704 selects candidate topic words in the document clusters. For example, the topic word processing module 704 can identify one or more non-topic words and new words from each of the topic document clusters as the candidate topic words.

The divergence value module 732 determines word divergence values of a word in a topic. In some implementations, the topic word classification module 704 can determine a topic word divergence value for a selected topic and a topic word. For example, the topic word processing module 704 can select the topic word from the topic dictionary of the selected topic. In certain implementations, the divergence value module 732 can determine the topic word divergence value based on topic word distributions in the document corpus 710 and in documents belonging to a topic document cluster of the selected topic. For example, the topic word divergence value can be substantially proportional to a ratio of a probability distribution of the topic word in the topic documents for a topic and a probability distribution of the topic word for all the documents in the document corpus 710. In one example, the topic word divergence value Q of a topic word w can be determined by $$Q = \frac{P_d(w)}{P(w)} \cdot \log P_d(w)$$

where $P_d(w)$ is the probability of the selected topic word w in the documents related to the topic d in the document corpus 710, and $P(w)$ is the probability of the selected topic word in all the documents in the document corpus 710.

The threshold evaluation module 734 can determine a topic divergence value based on one or more topic word divergence values. In some implementations, the threshold evaluation module 734 can determine the topic divergence value based on a central tendency of the topic word divergence values. For example, the threshold evaluation module 734 can compute an average value of the topic word divergence values and use the average value as the topic divergence value. Other values based on the topic word divergence values can also be used. For example, the threshold evaluation module 734 can determine the topic divergence value by comparing the determine topic word divergence values and selecting the greatest of the topic word divergence values as the topic divergence value.

In some implementations, the threshold evaluation module 734 can scale the topic divergence value. For example, the threshold evaluation module 734 can scale the topic divergence value according to the formula $$T = (1+t) \cdot S,$$

where T is the scaled topic divergence value, t is a real number, and S is the topic divergence value.

Similarly, the divergence value module 732 can determine a candidate word divergence value of a candidate topic word. The candidate topic word for a topic is an existing word or a new word that is not a topic word in a topic dictionary for that topic. The candidate word divergence value can be based on a probability distribution of the candidate topic word in the document corpus 710 and in documents belonging to a topic document cluster of the selected topic. In one example, the candidate topic word divergence value R of a candidate topic word $w_c$ can be determined by $$R = \frac{P_d(w_c)}{P(w_c)} \cdot \log P_d(w_c)$$

where $P_d(w_c)$ is the probability of the candidate topic word $w_c$ in the documents related to the topic d in the document corpus 710, and $P(w_c)$ is the probability of the candidate topic word in all the documents of the document corpus 710.

The topic word processing module 704 can determine whether a candidate topic word is a topic word based on the topic divergence value and the candidate word divergence value. For example, the candidate divergence value can be compared to the topic divergence value to determine whether the candidate topic word is a topic word. In an implementation, the threshold evaluation module 734 determines that the candidate topic word $w_c$ is a topic word if R>S, i.e.:

$$\frac{P_d(w_c)}{P(w_c)} \cdot \log P_d(w_c) > S,$$

where S is the topic divergence value.

Alternatively, the scaled value of T can be compared to the candidate word divergence value R, where T=(1+t)*S. In another implementation, the value of T can be further scaled according to the specificity of a corresponding topic. For example, for very general topics e.g., a topic of "sports," the value of T can be scaled to a magnitude that is much less than S so that determination of topic words is more inclusive. Conversely, for very specific topics, e.g., "Wavelet Mathematics," the value of T can be scaled to a magnitude that is substantially equal to or greater than S so that the determination of topic words is less inclusive. Other scaling techniques can also be used.

If the candidate topic word is determined to be a topic word for a topic, then dictionary updater module 706 updates a topic dictionary 708 for the topic to include the candidate topic word. For example, if the threshold evaluation module 734 determines that the candidate topic word We, which is an existing word, is a topic word of, for example, the topic 2, then the topic word processing module 704 can notify the dictionary updater module 706 to store the candidate topic word We in the topic 2 dictionary. Likewise, if the threshold evaluation module 734 determines that the candidate topic word Wn, which is a new word, is a topic word of, for example, the topic n, then the topic word processing module 704 can notify the dictionary updater module 706 to store the candidate topic word Wn in the topic n dictionary.

Other functions related to divergence values can also be used. For example, a pair of monotonic functions f(x) and g(x) can be used to determine a divergence value Q, e.g., $$Q = f\left[\frac{P_d(w)}{P(w)}\right] \cdot g[P_d(w)]$$

In the example implementation above, f(x)=x and g(x)=log (x). Other monotonic functions, however, can also be used.

Figure 8:
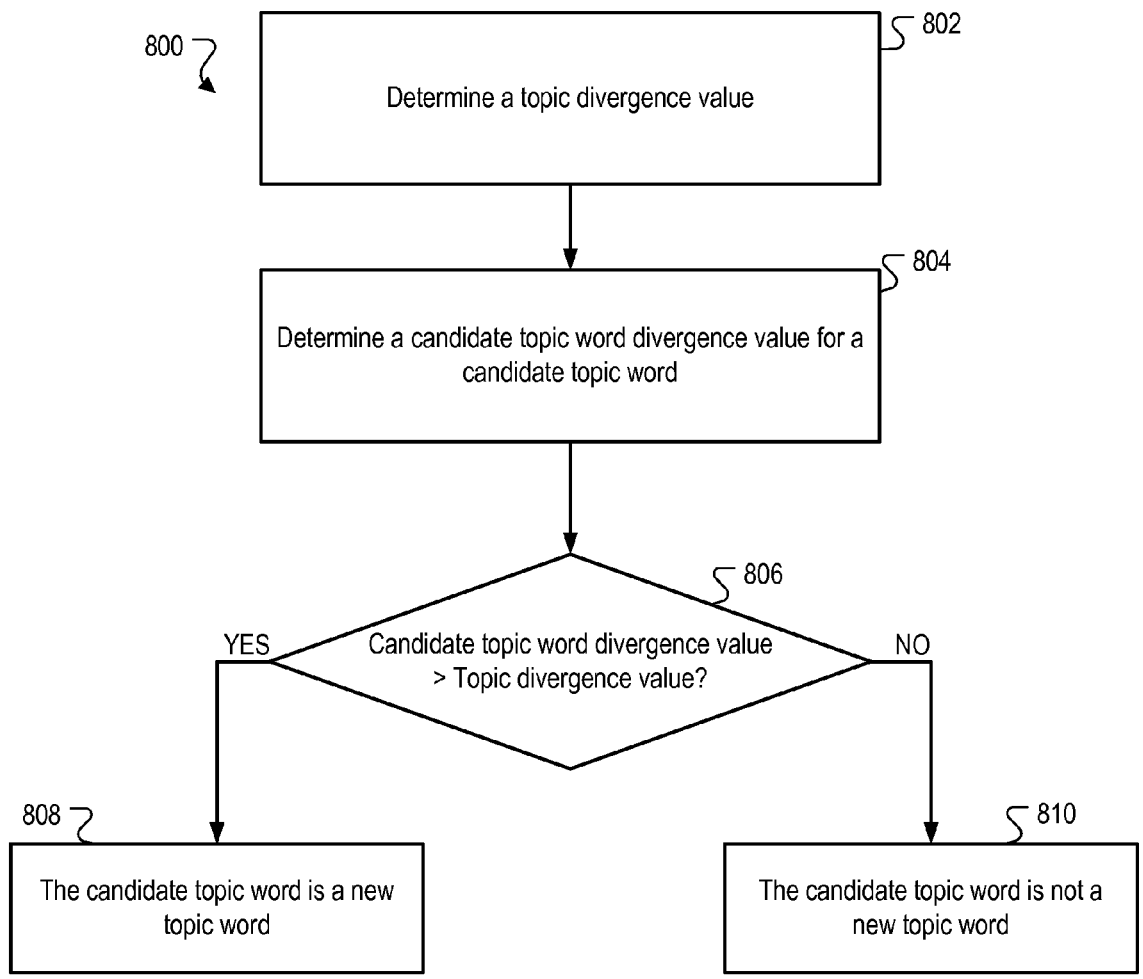
FIG. 8 is a flow chart of an example process for identifying topic words.

FIG. 8 is a flow chart of an example process 800 for identifying topic words. The process 800 can be implemented in a system that includes one or more computers implementing the system 700 of FIGS. 7A and 7B. In some examples, the topic word processing module 704 can identify a candidate topic word from the word corpus 204 and use the process 800 to determine whether the candidate topic word is a new topic word.

The process 800 determines a topic divergence value (802). For example, the divergence value module 732 can determine a topic divergence value of a topic based on one or more topic word divergence values of a selected topic. In some implementations, the topic divergence value can be substantially proportional to a ratio of a first topic word distribution in a topic document corpus (e.g., a distribution of the topic word in a topic document corpus) to a second topic word distribution in a document corpus (e.g., a distribution of the topic word in the document corpus 710). The topic document corpus can be a corpus of topic documents related to a topic, e.g., a subset of documents in the document corpus 710, and the document corpus can be a corpus of documents that includes the topic documents and other documents, e.g., the document corpus 710.

Next, the process 800 determines a candidate topic word divergence value for a candidate topic word (804). In some implementations, the candidate topic word divergence value can be substantially proportional to a ratio of a first distribution of the candidate topic word in the topic document corpus to a second distribution of the candidate topic word in the document corpus. For example, the divergence value module 732 can determine the candidate topic word divergence R by computing $$R = \frac{P_d(w_c)}{P(w_c)} \cdot \log P_d(w_c),$$

where $w_c$ is the candidate topic word, $P_d(w_c)$ is the probability of the candidate topic word w in the topic document corpus, and $P(w_c)$ is the probability of the candidate topic word in the document corpus 710.

After determining the topic divergence value and the candidate word divergence value, the process 800 determines whether the candidate topic word divergence value is greater than the topic divergence value (806). For example, the topic word processing module 704 can compare the candidate word divergence value and the topic divergence value.

If the candidate topic word divergence value is greater than the topic divergence value, then the process 800 identifies the candidate topic word as a new topic word (808). For example, if the candidate topic word divergence value is greater then the topic divergence value, the topic word processing module 704 can determine that the candidate topic word is a new topic word.

If the candidate topic word divergence value is not greater than the topic divergence value, then the process 800 does not identify the candidate topic word as a new topic word (810). For example, if the candidate topic word divergence value is not greater then the topic divergence value, the topic word processing module 704 can determine that the candidate topic word is not a new topic word.

Figure 9:
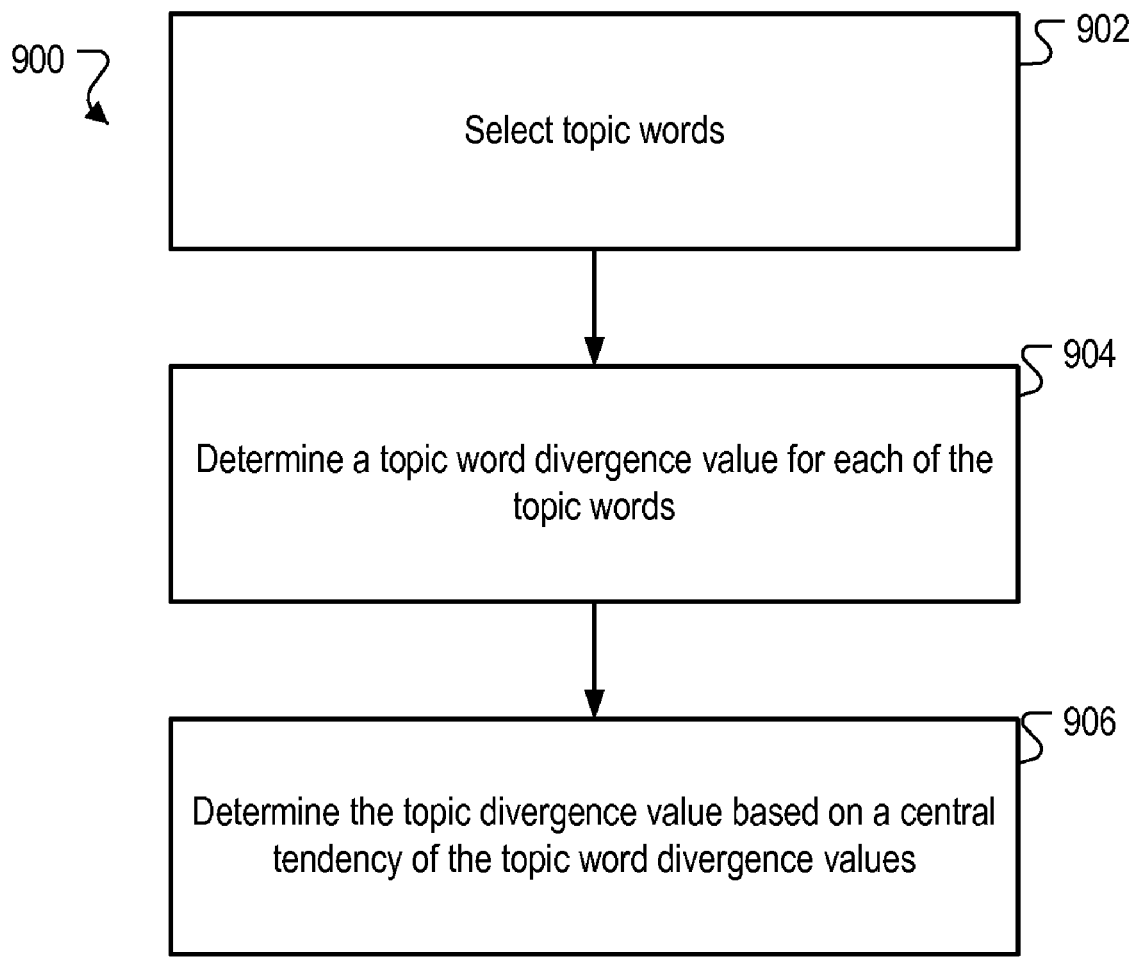
FIG. 9 is a flow chart of an example process for determining a topic word divergence value.

FIG. 9 is a flow chart of an example process 900 for determining a topic word divergence value. The process 900 can be implemented in a system that includes one or more computers implementing the system 700 of FIGS. 7A and 7B. In some implementations, the divergence value module 732 can use the process 900 to determine the topic divergence value.

The process 900 selects topic words (902). For example, the divergence value module 732 can select one or more topic words from one of the topics 714.

Next, the process 900 determines a topic word divergence value for each of the topic words (904). For example, each topic word divergence value is substantially proportional to a ratio of a first distribution of each topic word in the topic document corpus to a second distribution of each topic word in the document corpus. In one example, the divergence value module 732 can determine the topic word divergence value for each of the selected topic word (w) by computing $$Q = \frac{P_d(w)}{P(w)} \cdot \log P_d(w)$$

where $P_d(w)$ is the probability of the selected topic word w in the topic d, and $P(w)$ is the probability of the selected topic word in the document corpus.

After determining the topic word divergence values, the process 900 determines the topic divergence value based on a central tendency of the topic word divergence values (906). For example, the divergence value module 732 can determine the topic divergence value by determining an average of the topic word divergence values.

Figure 10:
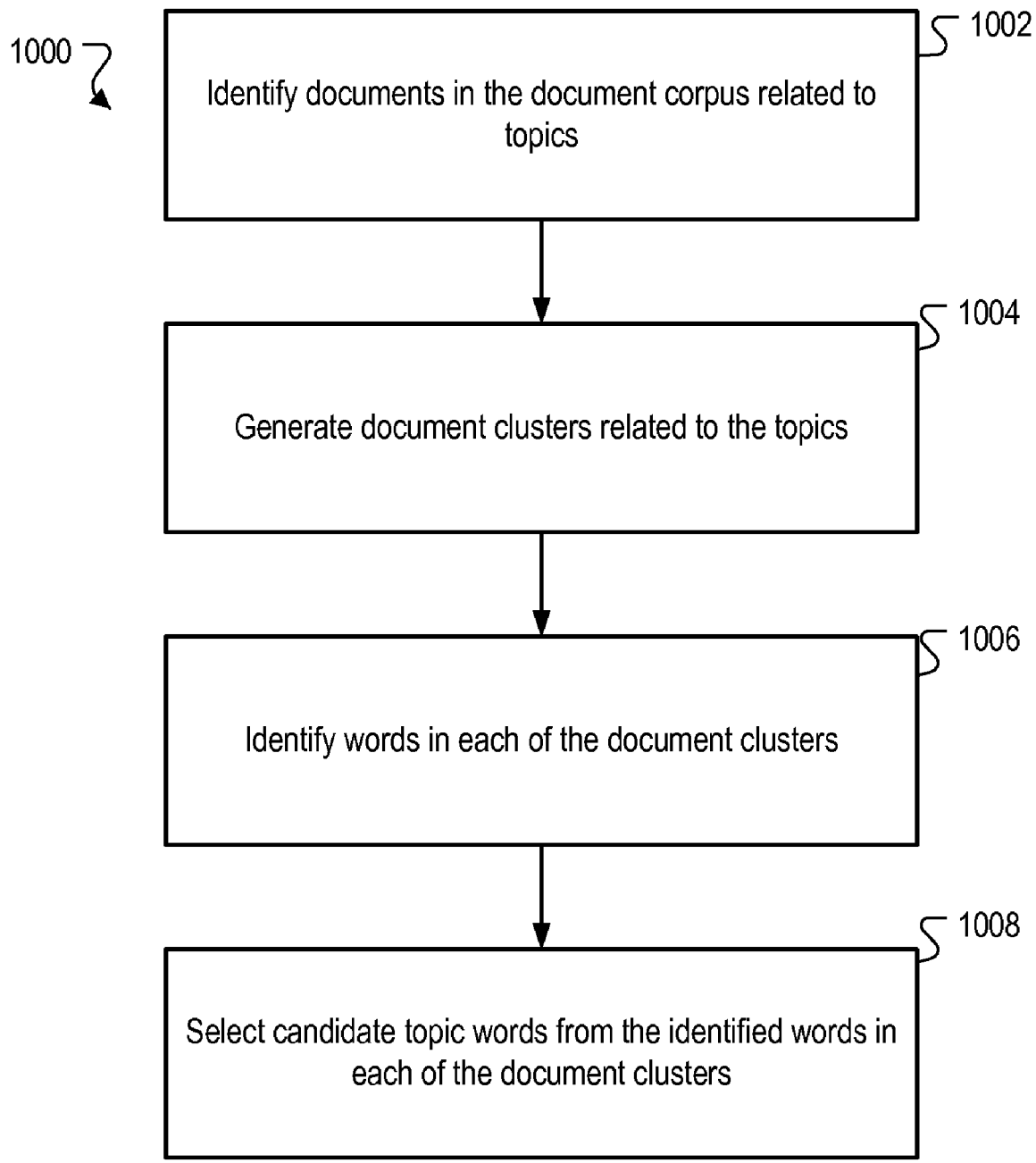
FIG. 10 is a flow chart of an example document and word clustering process.

FIG. 10 is a flow chart of an example document and word clustering process 1000. The process 1000 can be implemented in a system that includes one or more computers implementing the system 700 of FIGS. 7A and 7B.

The process 1000 identifies documents in the document corpus related to topics (1002). For example, the topic classification module 702 can identify documents in the document corpus 710 to be related to one of the topics 714 based on a distance between a TF-IDF vector of the document and a centroid vector of the topic. In one example, the topic classification module 702 can identify the documents using the iterative process as described with reference to FIG. 7B.

The process 1000 generates document clusters related to the topics (1004). Based on the identified relationship between the documents and the topics, the topic classification module 702 can generate a document cluster for each topic by including documents related to the topic in the document cluster.

Next, the process 1000 identifies words in each of the document clusters (1006). For example, the topic word processing module 704 can identify topic words, non-topic words, and/or new words in each of the topic document clusters using the topic dictionaries 708 and/or the new words data store 712.

The process 1000 selects candidate topic words from the identified words in each of the document clusters (1008). For example, the topic word processing module 704 can select the candidate topic words from the identified topic document clusters in the document corpus 710.

Figure 11:
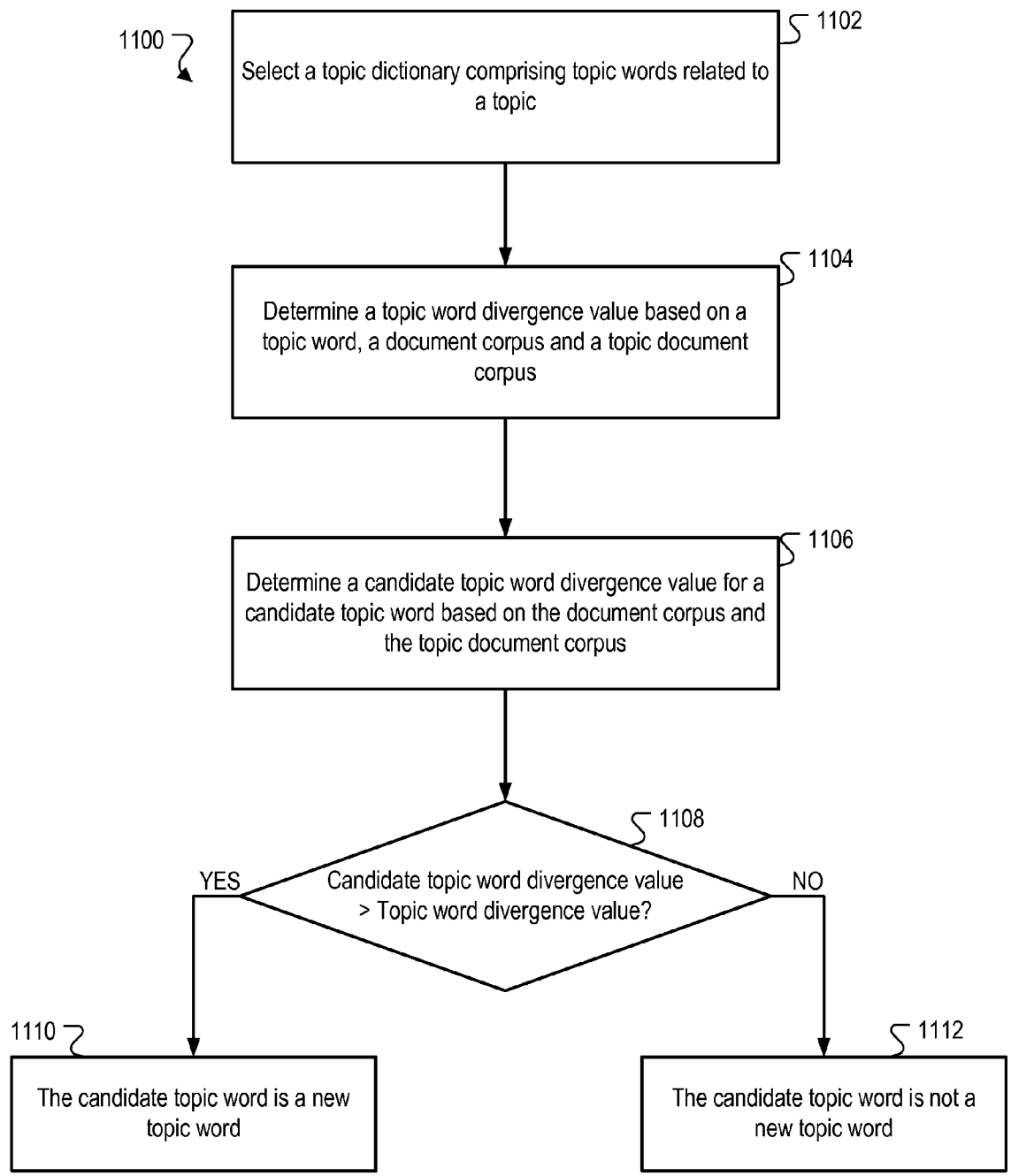
FIG. 11 is a flow chart of another example process for identifying topic words.

FIG. 11 is a flow chart of another example process for identifying topic words. The process 1100 can be implemented in a system that includes one or more computers implementing the system 700 of FIGS. 7A and 7B. In some implementations, the topic classification module 704 can use some or all of the operations in the process 1100 to identify new topic words.

The process 1100 selects a topic dictionary comprising topic words related to a topic (1102). For example, the topic classification module 704 can select one of the topic dictionaries 708 related to a selected topic (e.g., the topic 1, topic 2, . . . , or topic n).

The process 1100 determines a topic word divergence value based on a topic word, a document corpus and a topic document corpus (1104). For example, the topic document corpus can comprise the documents belonging to one of the topic document clusters generated by the topic classification module 702. The topic classification module 704 can select a topic word from the selected topic dictionary. Using the topic word and topic word distributions of the topic word in the document cluster and the document corpus, the divergence value module 732 can determine the topic word divergence value. For example, the divergence value module 732 can compute the topic word divergence value based on a probability of the selected topic word in the selected topic, and a probability of the selected topic word in the document corpus 710.

The process 1100 determines a candidate topic word divergence value for a candidate topic word based on the document corpus and the topic document corpus (1106). For example, the divergence value module 732 can determine the candidate topic word divergence value by selecting a candidate topic word and computing the candidate topic word divergence value based on a probability of the selected candidate topic word in the selected topic, and a probability of the selected candidate topic word in the document corpus 710.

The process 1100 determines whether the candidate topic word divergence value is greater than the topic word divergence value (1108). For example, the topic classification module 704 can compare the candidate topic word divergence value and the topic word divergence value.

If the candidate topic word divergence value is greater than the topic word divergence value, the candidate topic word is determined to be a new topic word (1110). For example, if the topic word processing module 704 determines that the candidate topic word divergence value is greater than the topic word divergence value, the candidate topic word is a new topic word.

If the candidate topic word divergence value is not greater than the topic word divergence value, the candidate topic word is not determined to be a new topic word (1112). For example, if the topic word processing module 704 determines that the candidate topic word divergence value is greater than the topic word divergence value, the candidate topic word is not a new topic word.

Referring back to the three- and four-character words/phrases that were identified as new words by the system 200, the 700 can identify each word as a candidate topic word, and determine divergence values as described above. In an example evaluation, the words "丁俊晖"(ding junhui); "本赛季"(this season); "世锦赛"(world championship); "季后赛"(play off); "范廿迪"(Van Cundy); and "国际足联"(FIFA) can be assigned to a sports topic, and the words "反倾销"(anti dumping of low-priced), "净利润"(net profit); "证监会"(SEC); "国资委"(China federal estate committee); "美联储"(FED); and "非流通股"(Non-tradable shares) can be assigned to a finance topic.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination:

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
determining a topic divergence value, the topic divergence value substantially proportional to a ratio of a first topic word distribution in a topic document corpus to a second topic word distribution in a document corpus, wherein the topic document corpus is a corpus of topic documents related to a topic, and the document corpus is a corpus of documents that includes the topic documents and other documents;
determining a candidate topic word divergence value for a candidate topic word, the candidate topic word divergence value substantially proportional to a ratio of a first distribution of the candidate topic word in the topic document corpus to a second distribution of the candidate topic word in the document corpus, wherein the candidate topic word is not a topic word in a topic dictionary for the topic; and
determining whether the candidate topic word is a new topic word for the topic based on the candidate topic word divergence value and the topic divergence value.

2. The method of claim 1, further comprising selecting an existing word in the topic dictionary for the topic as a topic word from which the topic divergence value is determined.

3. The method of claim 1, wherein determining a topic divergence value comprises:
selecting topic words for the topic;
determining a topic word divergence value for each of the topic words, each topic word divergence value substantially proportional to a ratio of a first distribution of each topic word in the topic document corpus to a second distribution of each topic word in the document corpus; and
determining the topic divergence value based on a central tendency of the topic word divergence values.

4. The method of claim 1, wherein the first distribution of the candidate topic word in the topic document corpus is proportional to a ratio of a distribution of the candidate topic word in the topic document corpus to a value based on a logarithm of the distribution.

5. The method of claim 1, wherein determining whether the candidate topic word is a new topic word comprises determining the candidate topic word is a new topic word if the candidate topic word divergence value is greater than the topic divergence value.

6. The method of claim 1, further comprising storing the candidate topic word in the topic dictionary if the candidate topic word is determined to be a new topic word.

7. The method of claim 1, further comprising:
identifying documents in the document corpus related to topics;
generating document clusters related to the topics;
identifying words in each of the document clusters; and
selecting candidate topic words from the identified words in each of the document clusters.

8. The method of claim 1, further comprising:
determining first word frequencies for existing words and a candidate word in a training corpus, the candidate word defined by a sequence of constituent words, each constituent word being an existing word in a dictionary, and the training corpus comprising a first subset of the document corpus;
determining second word frequencies for the constituent words and the candidate word in a development corpus, the development corpus comprising a second subset of the document corpus;
determining a candidate word entropy measure based on the second word frequency of the candidate word and the first word frequencies of the constituent words and the candidate word;
determining an existing word entropy measure based on the second word frequencies of the constituent words and the first word frequencies of the constituent words and the candidate word; and
determining that the candidate word is a candidate topic word if the candidate word entropy measure exceeds the existing word entropy measure.

9. The method of claim 8, wherein:
determining first word frequencies for existing words and a candidate word in a training corpus comprises training a language model for probabilities of the existing words and the candidate words in the training corpus; and
wherein determining second word frequencies for the constituent words and the candidate word in a development corpus comprises determining a word count value for each of the constituent words and the candidate word in the development corpus.

10. The method of claim 9, wherein:
determining a candidate word entropy measure based on the second word frequency of the candidate word and the first word frequencies of the constituent words and the candidate word comprises:
determining a first logarithmic value based on the probabilities of the candidate word and the constituent words; and
determining the candidate word entropy measure based on the word count value of the candidate word and the first logarithmic value; and
determining an existing word entropy measure based on the second word frequencies of the constituent words and the first word frequencies of the constituent words and the candidate word comprises:
determining second logarithmic values based on the probabilities of the candidate word and the constituent words; and
determining the existing word entropy measure based on the word counts of the constituent words and the second logarithmic values.

11. The method of claim 1, wherein the candidate topic word comprises one or more Hanzi characters.

12. A computer-implemented method, comprising:
selecting a topic dictionary comprising topic words related to a topic;
determining a topic word divergence value based on a topic word, a document corpus and a topic document corpus, wherein the topic document corpus is a corpus of topic documents related to the topic, and the document corpus is a corpus of documents that includes the topic documents and other documents, and the topic word is a word that is related to the topic;

determining a candidate topic word divergence value for a candidate topic word based on the document corpus and the topic document corpus, wherein the candidate topic word is not a topic word in the topic dictionary; and determining whether the candidate topic word is a new topic word for the topic based on the candidate topic word divergence value and the topic word divergence value.

13. The method of claim 12, further comprising storing the candidate topic word in the topic dictionary if the candidate topic word is determined to be a new topic word.

14. The method of claim 12, wherein determining a topic word divergence value comprises:

selecting existing topic words in the topic dictionary;

determining an existing topic word divergence values for each of the topic words based on the document corpus and the topic document corpus; and determining the topic word divergence value based on a central tendency of the existing topic word divergence values.

15. The method of claim 12, wherein determining a candidate topic word divergence value for the candidate topic word based on the document corpus and the topic document corpus comprises:

determining a first probability associated with the candidate topic word in the topic document corpus;

determining a second probability associated with the candidate topic word in the document corpus; and calculating the candidate topic word divergence value based on a ratio of the first probability to the product of the second probability and value based on a logarithm on the first probability.

16. The method of claim 12, wherein the candidate topic word comprises one or more Hanzi characters.

17. An apparatus comprising software stored in a non-transitory computer readable medium, the software comprising computer readable instructions executable by a computer processing device and that upon such execution cause the computer processing device to:

determine a topic word divergence value based on a topic word, a document corpus and a topic document corpus, wherein the topic document corpus is a corpus of topic documents related to a topic, and the document corpus is a corpus of documents that includes the topic documents and other documents, and the topic word is a word that is in a topic dictionary that is related to the topic;

determine a candidate topic word divergence value for a candidate topic word based on the document corpus and the topic document corpus, wherein the candidate topic word is not a topic word in the topic dictionary;

determine whether the candidate topic word is a topic word for the topic based on the candidate topic word divergence value and the topic word divergence value; and store the candidate topic word in the topic dictionary if the candidate topic word is determined to be a topic word.

18. A system, comprising:

a data store storing a topic dictionary comprising topic words related to a topic;

a topic word processing module configured to:

determine a topic word divergence value based on a topic word, a document corpus and a topic document corpus, wherein the topic document corpus is a corpus of topic documents related to a topic, the document corpus is a corpus of documents that includes the topic documents and other documents, and the topic word is a word in a topic dictionary that is related to the topic;

select a candidate topic word that is not a word in the topic dictionary;

determine a candidate topic word divergence value for the candidate topic word based on the document corpus and the topic document corpus; and determine whether the candidate topic word is a topic word for the topic based on the candidate topic word divergence value and the topic word divergence value; and a dictionary updater module configured to store the candidate topic word in the topic dictionary if the candidate topic word is determined to be a topic word.

19. The system of claim 18, wherein the topic word processing module is configured to:

determine a first probability associated with the candidate topic word in the topic document corpus;

determine a second probability associated with the candidate topic word in the document corpus; and calculate the candidate topic word divergence value based on a ratio of the first probability to the product of the second probability and a logarithmic value based on the first probability.

20. A method, comprising:

determining a divergence threshold for a topic document corpus, the divergence threshold proportional to the ratio of a first topic word probability for a topic word in the topic document corpus to a second topic word probability for the topic word in the document corpus, wherein the topic document corpus is a corpus of topic documents related to a topic, the topic word is a word in a topic dictionary related to the topic, and the document corpus is a corpus of documents that includes the topic documents and other documents;

determining a candidate word divergence value for a candidate word that is not a word in the topic dictionary, the candidate word divergence value proportional to the ratio of a first candidate word probability for the candidate word with reference to the topic document corpus to a second candidate word probability for the candidate word with reference to the document corpus; and determining that the candidate word is a topic word for the topic if the candidate word divergence value exceeds the divergence threshold.

21. A system, comprising:

means for determining a topic divergence value, the topic divergence value substantially proportional to a ratio of a first topic word distribution in a topic document corpus to a second topic word distribution in a document corpus, wherein the topic document corpus is a corpus of topic documents related to a topic, and the document corpus is a corpus of documents that includes the topic documents and other documents;

means for determining a candidate topic word divergence value for a candidate topic word, the candidate topic word divergence value substantially proportional to a ratio of a first distribution of the candidate topic word in the topic document corpus to a second distribution of the candidate topic word in the document corpus, wherein the candidate top word is not a topic word in a topic dictionary for the topic; and means for determining whether the candidate topic word is a new topic word for the topic based on the candidate topic word divergence value and the topic divergence value.

22. A system, comprising:
means for selecting a topic dictionary comprising topic words related to a topic;
means for determining a topic word divergence value based on a topic word, a document corpus and a topic document corpus, wherein the topic document corpus is a corpus of topic documents related to a topic, and the document corpus is a corpus of documents that includes the topic documents and other documents, and the topic word is a word that is in the topic dictionary;
means for determining a candidate topic word divergence value for a candidate topic word based on the document corpus and the topic document corpus, wherein the candidate topic word is not a topic word in the topic dictionary; and
means for determining whether the candidate topic word is a new topic word for the topic based on the candidate topic word divergence value and the topic word divergence value.

23. A computer processing device comprising:
means for determining a topic word divergence value based on a topic word, a document corpus and a topic document corpus, wherein the topic document corpus is a corpus of topic documents related to a topic, and the document corpus is a corpus of documents that includes the topic documents and other documents, and the topic word is a word that is in a topic dictionary that is related to the topic;
means for determining a candidate topic word divergence value for a candidate topic word based on the document corpus and the topic document corpus, wherein the candidate topic word is not a word in the topic dictionary;
means for determining whether the candidate topic word is a topic word based on the candidate topic word divergence value and the topic word divergence value; and
means for storing the candidate topic word in the topic dictionary if the candidate topic word is determined to be a topic word.

24. A system, comprising:
means for determining a divergence threshold for a topic document corpus, the divergence threshold proportional to the ratio of a first topic word probability for a topic word in the topic document corpus to a second topic word probability for the topic word in the document corpus, wherein the topic document corpus is a corpus of topic documents related to a topic, the topic word is a word in a topic dictionary related to the topic, and the document corpus is a corpus of documents that includes the topic documents and other documents;
means for determining a candidate word divergence value for a candidate word that is not a topic word in the topic dictionary, the candidate word divergence value proportional to the ratio of a first candidate word probability for the candidate word with reference to the topic document corpus to a second candidate word probability for the candidate word with reference to the document corpus; and
means for determining that the candidate word is a topic word for the topic if the candidate word divergence value exceeds the divergence threshold.

* * * * *